US012220851B2

(12) United States Patent
Rijnhart et al.

(10) Patent No.: US 12,220,851 B2
(45) Date of Patent: Feb. 11, 2025

(54) METHODS AND INSTALLATIONS FOR PRODUCING A BIAXIALLY ORIENTED TUBE FROM THERMOPLASTIC MATERIAL

(71) Applicant: RPFlow R&D B.V., Dedemsvaart (NL)

(72) Inventors: Nicolaas Wilhelmus Hendrikus Rijnhart, Oldenzaal (NL); Gerrit Lucas Meier, Hardenberg (NL)

(73) Assignee: RPFlow R&D B.V., Dedemsvaart (NL)

( * ) Notice: Subject to any disclaimer, the term of this patent is extended or adjusted under 35 U.S.C. 154(b) by 875 days.

(21) Appl. No.: 17/416,669

(22) PCT Filed: Dec. 20, 2019

(86) PCT No.: PCT/NL2019/050871
§ 371 (c)(1),
(2) Date: Jun. 21, 2021

(87) PCT Pub. No.: WO2020/130835
PCT Pub. Date: Jun. 25, 2020

(65) Prior Publication Data
US 2022/0072752 A1    Mar. 10, 2022

(30) Foreign Application Priority Data

Dec. 21, 2018   (NL) .................................... 2022290
Jan. 18, 2019   (NL) .................................... 2022421

(51) Int. Cl.
*B29C 48/255*   (2019.01)
*B29C 48/00*    (2019.01)
(Continued)

(52) U.S. Cl.
CPC .......... *B29C 48/0018* (2019.02); *B29C 48/09* (2019.02); *B29C 48/255* (2019.02);
(Continued)

(58) Field of Classification Search
CPC ... B29C 48/0018; B29C 48/09; B29C 48/255; B29C 48/32; B29C 48/355;
(Continued)

(56) References Cited

U.S. PATENT DOCUMENTS 6,214,283 B1    4/2001   Visscher et al.
2012/0261051 A1*   10/2012   Visscher ................. B29C 48/09
156/64

FOREIGN PATENT DOCUMENTS

EP    2404735 A1    1/2012
WO    9002644 A1    3/1990
(Continued)

OTHER PUBLICATIONS

International Search Report and Written Opinion for International Application No. PCT/NL2019/050871 mailed Jul. 29, 2020, 19 pages.
(Continued)

*Primary Examiner* — Xiao S Zhao
*Assistant Examiner* — Joseph S Leyson
(74) *Attorney, Agent, or Firm* — Troutman Pepper Locke LLP; Ryan A. Schneider; Stephanie J. Remy

(57) ABSTRACT

A method for producing a biaxially oriented tube from thermoplastic material, wherein a tube in preform condition is extruded from thermoplastic material and is subjected to a temperature conditioning. Use is made of an expansion device and of a drawing device which is arranged downstream of the expansion device. The expansion device includes a non-deformable expansion part and a run-on part located upstream of the expansion part and having an upstream sealing member. The expansion device further includes a first gas discharge duct having one or more first inlet ports in the exterior surface of the expansion device, a first inlet port being open or closed or partly closed depen-
(Continued)

dent on whether or not the first inlet port is covered and closed, or partly closed, by the tube.

16 Claims, 8 Drawing Sheets

(51) Int. Cl.
| | |
|---|---|
| *B29C 48/09* | (2019.01) |
| *B29C 48/25* | (2019.01) |
| *B29C 48/32* | (2019.01) |
| *B29C 48/355* | (2019.01) |
| *B29C 48/885* | (2019.01) |
| *B29C 48/89* | (2019.01) |
| *B29C 48/90* | (2019.01) |
| *B29C 48/92* | (2019.01) |

(52) U.S. Cl.
CPC ............ *B29C 48/269* (2019.02); *B29C 48/32* (2019.02); *B29C 48/355* (2019.02); *B29C 48/885* (2019.02); *B29C 48/89* (2019.02); *B29C 48/902* (2019.02); *B29C 48/903* (2019.02); *B29C 48/904* (2019.02); *B29C 48/908* (2019.02); *B29C 48/92* (2019.02); *B29C 2948/92019* (2019.02); *B29C 2948/92428* (2019.02); *B29C 2948/926* (2019.02); *B29C 2948/92923* (2019.02)

(58) Field of Classification Search
CPC ..... B29C 48/885; B29C 48/89; B29C 48/901; B29C 48/902; B29C 48/903; B29C 48/92; B29C 2948/92019; B29C 2948/92428; B29C 2948/926; B29C 2948/92923
See application file for complete search history.

(56) References Cited

FOREIGN PATENT DOCUMENTS

| WO | 2009049374 A1 | 4/2009 |
| WO | 2011049436 A2 | 4/2011 |
| WO | 2013151420 A1 | 10/2013 |

OTHER PUBLICATIONS

Search Report and Written Opinion for NL Application No. 2022421 dated Sep. 16, 2019, 11 pages.

\* cited by examiner

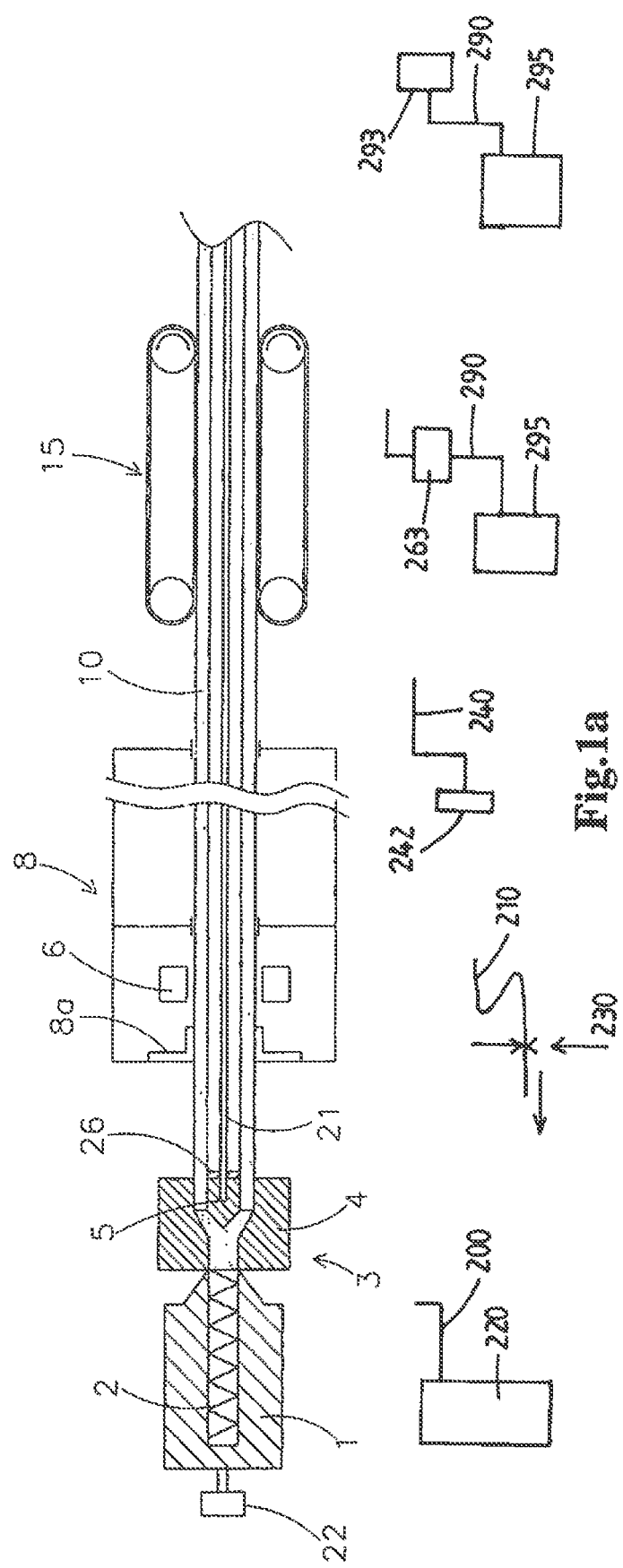

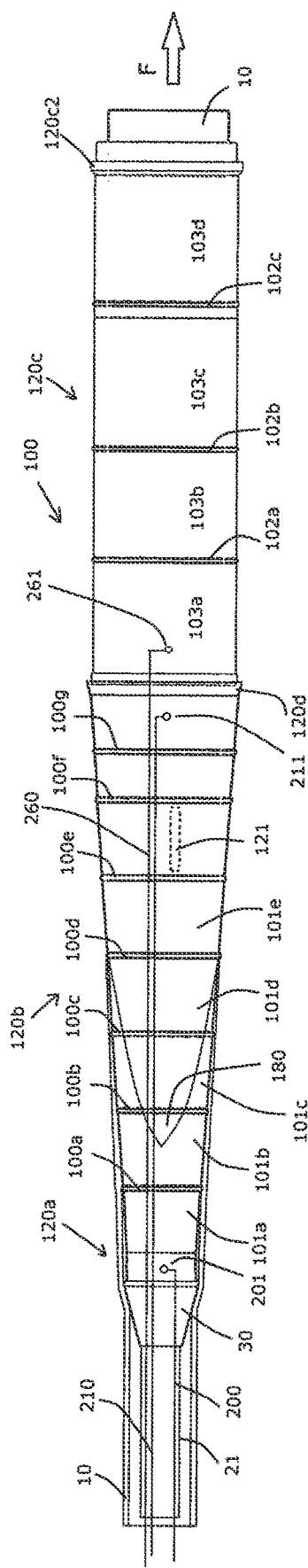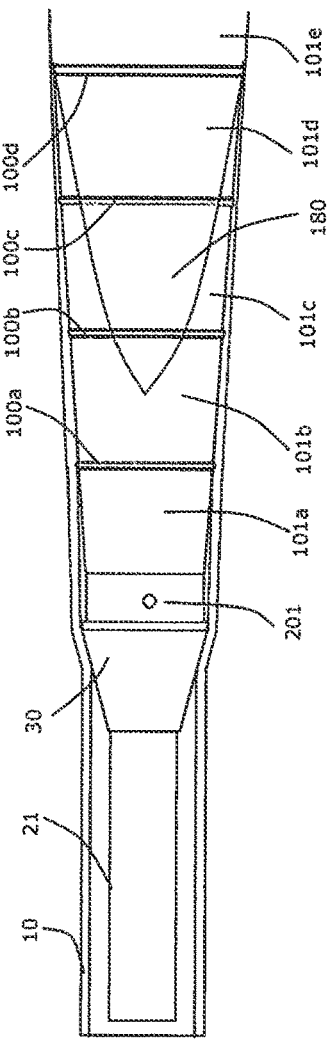

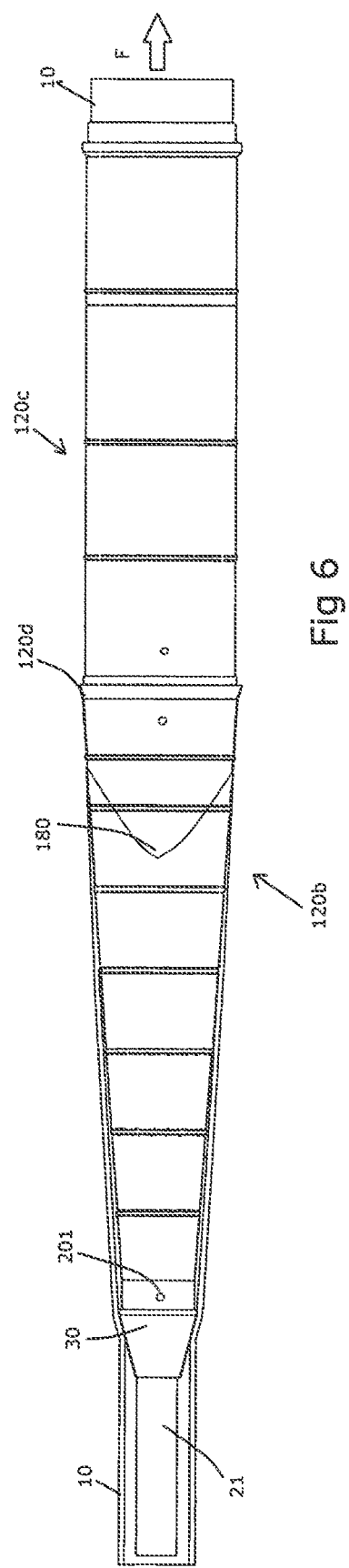

METHODS AND INSTALLATIONS FOR PRODUCING A BIAXIALLY ORIENTED TUBE FROM THERMOPLASTIC MATERIAL

CROSS-REFERENCE TO RELATED APPLICATIONS

This application is a § 371 national stage of International Application PCT/NL2019/050871, with an international filing date of 20 Dec. 2019, which International Application claims the benefit of NL Patent Application Serial Nos. 2022290 filed on 21 Dec. 2018 and U.S. Pat. No. 2,022,421 filed on 18 Jan. 2019, the benefit of each of the earlier filing dates hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to the manufacturing of biaxially oriented tubing of thermoplastic material, e.g. for water mains or other pressurized medium transportation.

The first aspect of the invention relates in general to the issue of establishing production processes and production installations that allow to produce biaxially oriented tubing of thermoplastic material, the oriented tubing having a desired uniformity of the final dimensions of the oriented tubing as well as good strength properties, e.g. as the production of rigid pipes, e.g. pressure pipes for transportation of water or gas is envisaged.

2. Description of Related Art

When producing biaxially oriented tubing of thermoplastic material, e.g. pipes of polyvinylchloride, it has proven to be difficult to produce tubing with uniform final dimensions. Such uniformity is desirable, e.g. as biaxially oriented tubing elements, e.g. pressure pipes, e.g. for transportation of water, are interconnected end-to-end, e.g. via socket connections.

In WO2011/049436, a production process for producing biaxially oriented tubing of thermoplastic material, e.g. pipes of polyvinylchloride, is disclosed. Herein a thick-walled tube in preform condition is extruded from thermoplastic material using an extruder which is provided with an extruder die head having an inner die member. The inner die member forms a lumen in the tube in preform condition. The tube in preform condition is subjected to a temperature conditioning, so that a tempered tube in preform condition is obtained having an orientation temperature which is suitable for the thermoplastic material. Use is made of an expansion device and of a drawing device which is arranged downstream of the expansion device. The expansion device is connected to the extruder die head via an anchor rod that extends through the lumen of the thick-walled tube in preform condition. The expansion device comprises:

a non-deformable expansion part having a gradually increasing diameter to a maximum diameter at a downstream end thereof, a run-on part which is located upstream of the expansion part, the run-on part having an upstream sealing member arranged upstream of the expansion part.

The expansion device comprises a first gas supply duct that has one or more first gas outlet ports in the outer surface of the expansion device downstream of the upstream sealing member. This first gas supply duct extends from the expansion device in an upstream direction through the anchor rod to the extruder and is connected there to a source of pressurized gas, e.g. an air compressor feeding into a pressurized air storage tank that is connected via a valve arrangement to the first gas supply duct. The expansion device also comprises a first gas discharge duct that has one or more first inlet ports in the exterior surface of the expansion part of the expansion device. This first gas discharge duct extends in upstream direction through the anchor rod to a discharge, e.g. into the ambient air. In operation, a first inlet port of the first gas discharge duct is open or closed or partly closed dependent on whether or not the first inlet port is covered and closed, or partly closed, by the tube, so generally a self-governing situation. A first gas volume is present between the expansion device and the tube. This first gas volume is limited at an upstream end thereof by a sealing contact between the tube in preform condition and the upstream sealing member of the run-on part and at a downstream end thereof by a sealing engagement between the tube and at least a downstream portion of the expansion part, e.g. near or at a transition to the run-off part. During operation, a first gas flow is effected from a first gas supply source, e.g. an air compressor unit with an air storage tank, via the first gas supply duct and the one or more first gas outlet ports thereof into the first gas volume. Dependent on whether or not the first inlet port of the first gas discharge duct is covered and closed, or partly closed, by the tube, gas flows out of the first gas volume via the one or more first gas inlet ports and the first discharge duct. The pressure of the gas in the first gas volume is used to cause a gradual diametrical expansion of the tube already before the tube contacts the expansion part, which contact may bring about a further diametrical expansion of the tube.

In addition, it is known, as is disclosed in WO2011/049436, to make use of an expansion device having a non-deformable run-off part that adjoins the expansion part of the expansion device downstream of the expansion part. This run-off part has a reduced diameter section having a smaller diameter than the maximum diameter of the expansion part. The run-off part has a downstream sealing member that is downstream of the reduced diameter section. In operation, a second gas volume is established between the reduced diameter section run-off part of the expansion device and the tube. This second gas volume is separated from the first gas volume through an upstream sealing engagement of the tube with the expansion device in a transition region. The second gas volume is delimited by a downstream sealing engagement between the tube and the downstream sealing member of the run-off part. The expansion device comprises a second gas duct having a port in the exterior surface of the reduced diameter section of the run-off part. The second gas duct is connected to a second gas source.

In general, the method comprises drawing the tempered tube in preform condition over the expansion device using the drawing device. In all, the tube is transformed from a relatively thick-walled tube in preform condition into a larger diameter biaxially oriented tube having a thinner wall thickness and with thermoplastic material in the wall which is oriented in axial direction and in circumferential direction of the tube. As known in the art, the biaxially oriented tube is cooled in order to freeze in the obtained biaxial orientation.

In a prior art production process, a constant first gas pressure is maintained by means of a first gas pressure control valve regulating the gas pressure in the first gas volume. Also, a constant second gas pressure is maintained by means of a second gas pressure control valve regulating the gas pressure in the second gas volume.

In particular in view of the large diameters of biaxially oriented tubing to be produced, e.g. more than 300 mm outer diameter (OD), e.g. of between 400 and 650 mm outer diameter, stability of the production has become an even more important issue.

BRIEF SUMMARY OF THE INVENTION

The first aspect of the present invention aims to provide measures that enhance stability of the production process.

The first aspect of the invention provides for a production method which is characterized in that the first gas flow, that is supplied from the first gas supply source via the first gas supply duct and the one or more first gas outlet ports thereof into the first gas volume, is maintained at a gas pressure independent constant first gas flow rate.

The inventive concept of the first aspect of the invention does away with the prior art approach of control of the gradual expansion in the production process on the basis of maintaining a constant gas pressure in the first gas volume. Instead the inventive concept provides control of the gradual expansion in the production process on the basis of maintaining a constant first gas flow rate from the respective source into the first gas volume, which first gas flow is independent of the actual gas pressure in the first gas volume as that pressure is now predominantly governed by the one or more first inlet ports to the first gas discharge duct being open or closed or partly closed dependent on whether or not the first inlet port is covered and closed, or partly closed, by the tube.

In practical embodiments, a gas mass flow controller valve, e.g. manufactured by Bronkhorst, may be provided and operated to maintain the gas pressure independent constant first gas flow rate to the first gas volume. It has been observed that local variations in the stiffness of the tube mainly due to variation in temperature of the tube, e.g. between one axial segment of the tube and another axial segment of the tube, lead to variation of the actual diametrical expansion and thus to variation of the opening and closing of the first inlet ports of the gas discharge duct. It is found that with the inventive supply of gas to the first gas volume at a constant flow rate instead of the prior art constant gas pressure in the first gas volume—a stabilization of the gradual expansion of the tube and thus of the entire biaxial orientation process is obtained, e.g. reflected in further enhanced accuracy of the diameter and/or of the final wall thickness of the obtained tube.

In a practical embodiment, as shown in exemplary embodiments in WO2011/049436, an anchor rod extends from the location of the extruder through the lumen of the tube in preform condition to the expansion device. The anchor rod serves to keep the expansion device in place. In practical embodiments, the anchor rod may be more than 10 meters in length between the extruder and the expansion device, even more than 20 meters in order to have sufficient length for equipment involved in cooling the extruded tube in preform condition and tempering the tube to reach the desired temperature profile for the biaxial orientation process.

In a practical embodiment, the first gas supply duct extends in upstream direction through the anchor rod to the location of the extruder and is connected there to a source of pressurized gas, e.g. an air compressor feeding into a pressurized air storage tank that is connected via a valve arrangement to the first gas supply duct. As preferred, the valve arrangement comprises the gas mass flow controller valve that serves a maintain a pressure independent flow rate of air, or another gas, into the first gas volume.

In a practical embodiment, as shown in exemplary embodiments in WO2011/049436, the first gas discharge duct extends from the expansion device in upstream direction through the anchor rod to a discharge end, e.g. into the ambient air.

In a further development of the first aspect of the invention, it is envisaged that the first gas flow out of the first gas volume via the one or more first gas inlet ports and the first gas discharge duct is throttled by an adjustable throttle valve. This measure allows to stabilize the gas flow out of the first gas volume that takes place via the first gas discharge duct. In a practical embodiment, the throttle valve is arranged at the location of the extruder, so at the discharge end of the first gas discharge duct.

In an embodiment, a first gas discharge flow monitoring device is provided, e.g. at the location of the extruder, that is operated to monitor the first gas flow out of the first gas volume via the first gas discharge duct. In an embodiment, the method comprises a control routine, e.g. using a computerized controller, wherein the monitored first gas flow out of the first gas volume is compared to the constant first gas flow rate into the first gas volume. In an embodiment, the throttle valve of the first gas discharge duct is automatically adjusted on the basis of this comparison, e.g. the throttle valve being further opened in case the comparison shows that the gas flow out of the first volume is too much below the constant first gas flow rate into the first gas volume and the throttle valve being further closed in case the comparison shows that the gas flow out of the first volume is too much above the constant first gas flow rate into the first gas volume set. This approach can be done using a comparison done over a time interval, e.g. with multiple measurements being averaged allowing to enhance stability.

In an embodiment, the expansion device has a first gas pressure sensing duct distinct from the first gas supply duct and from the first gas discharge duct. The first gas pressure sensing duct has a first gas pressure sensing port in the exterior surface of the expansion part of the expansion device and a first gas pressure sensor is in communication with the first gas pressure sensing duct and measures the actual gas pressure in the first gas volume. In a practical embodiment, the first gas pressure sensor is located near the extruder. The provision of the first gas pressure sensor and associated duct allows to monitor the actual gas pressure in the first gas volume, e.g. allowing to avoid overpressurization that may lead to leakage of gas from the first volume at one of the upstream or downstream end thereof (i.e. the sealing engagement with the upstream sealing member and the engagement with the expansion part). It may also allow for monitoring whether the inventive control of the first gas volume slowly shifts towards an effective gas pressure in the first gas volume that is deemed too high or too low.

In an embodiment, as shown in exemplary embodiments in WO2011/049436, use is made of an expansion device having a non-deformable run-off part that adjoins the expansion part of the expansion device downstream of the expansion part. Herein the run-off part has a reduced diameter section having a smaller diameter than the maximum diameter of the expansion part. The run-off part has a downstream sealing member that is downstream of the reduced diameter section. A second gas volume is established between the reduced diameter section run-off part of the expansion device and the tube. This second gas volume is separated from the first gas volume through an upstream sealing engagement of the tube with the expansion device in a transition region. The second gas volume is further delimited by a downstream sealing engagement between the tube and the downstream sealing member of the run-off part. It is envisaged that the expansion device comprises a second gas duct having a port in the exterior surface of the reduced diameter section of the run-off part and that this second gas duct is connected to a second gas source, distinct from the first gas source and the flow of gas through the first gas volume. It is envisaged, in embodiments, that the pressure of the gas in the second gas volume is maintained at a constant second gas pressure during production of the biaxially oriented tube. It is further envisaged that a second gas flow monitoring device is provided that is operated to monitor any gas flow into and out of the second gas volume via the second gas duct. This inventive approach allows to determine whether or not gas leaks out of or into the second gas volume, e.g. due to the upstream sealing engagement of the tube with the expansion device in a transition region not being as effective. In embodiments, corrective action may be derived from the monitoring of any gas flow into and out of the second gas volume, e.g. cooling of the tube when passing over the run-off part being adapted, e.g. increased to enhance the sealing engagement of the tube at the upstream and/or downstream end of the second gas volume.

In an embodiment, as shown in exemplary embodiments in WO2011/049436, an upstream outer diameter ring member is arranged around the tube at an axial location corresponding to the axial location of the reduced diameter section. Possibly, the upstream outer diameter ring member is the sole outer diameter that is arranged around the tube at an axial location corresponding to the axial location of the reduced diameter section.

The upstream outer diameter ring member is arranged such that the oriented tube passes through the upstream outer diameter ring member while being in contact with the upstream outer diameter ring member. In practical embodiments, the upstream outer diameter ring member is arranged in proximity to the transition between the expansion part and the run-off part of the expansion device.

In an embodiment, use is made of a first external cooling device that is adapted and operated to cool the oriented tube externally while passing over the run-off part, e.g. the first external cooling device having one or more nozzles that spray a liquid coolant, e.g. water, on the tube, preferably on a segment of the tube directly downstream of the upstream outer diameter ring member with the exterior of the tube remaining dry upstream of the upstream outer diameter ring member.

In a further development, a gas compartment sealing member is arranged at a distance downstream of the non-deformable run-off part of the expansion device so that a third gas volume is established in the lumen of the tube downstream of the run-off part, which third gas volume is separated from the second gas volume through the downstream sealing engagement between the tube and the downstream sealing member of the run-off part and is separated from the first gas volume. Herein the expansion device comprises a third gas duct having a port in communication with the third gas volume. The third gas duct is connected to a third gas source. The pressure of the gas in the third gas volume is, in embodiments, maintained at a constant third gas pressure, and is set independent of the pressure in the second gas volume. A third gas flow monitoring device is provided that is operated to monitor any gas flow into and out of the third gas volume via the third gas duct. This inventive approach allows to determine whether or not gas leaks out of or into the third gas volume, e.g. due to the sealing engagement of the tube with the downstream sealing member of the run-off part not being as effective and/or the gas compartment sealing member being not as effective. In embodiments, corrective action may be derived from the monitoring of any gas flow into and out of the third gas volume, e.g. cooling of the tube when passing over the third gas volume being adapted, e.g. increased to enhance the sealing engagement of the tube at the upstream and/or downstream end of the third gas volume.

In an embodiment, the first aspect of the invention envisages that both any flow into and out of the second gas volume and any flow into and out of the third gas volume are being monitored, e.g. allowing to establish whether gas flows from the second into the third gas volume or in opposite direction, e.g. corrective action being based thereon, e.g. adjustment of the gas pressure setting for any or both of the second and third gas volumes.

In an embodiment, use is made of a second external cooling device that is adapted and operated to cool the oriented tube externally downstream of a downstream outer diameter ring member at an axial location upstream of or in proximity of the gas compartment sealing member delimiting the downstream end of the third gas volume. For example, this second external cooling device having one or more nozzles that spray a liquid coolant, e.g. water, on the tube, preferably on a segment of the tube directly downstream of the downstream outer diameter ring member. For example, this second external cooling device is controlled, at least in part, on the basis of the monitoring of any gas flow into and out of the third gas volume, possibly also the second gas volume. For example, monitoring both the gas flow into and out of the second and the third gas volumes may allow to determine whether the sealing by means of the gas compartment sealing member is effective, and if not, possibly, the cooling effect of the second external cooling device is increased so that the tube shrinks harder and seals stronger on the gas compartment sealing member.

In a preferred embodiment, the gas compartment sealing member is a flexible member, e.g. a member with a flexible perimeter, e.g. of elastomer material.

In an embodiment, at least one outer diameter ring member is mounted so as to be displaceable in axial direction. In an embodiment, the downstream outer diameter ring member is mounted so as to be displaceable in axial direction relative to the stationary mounted upstream outer diameter ring member.

In an embodiment, the downstream outer diameter ring member is mounted so as to be displaceable in axial direction and is displaced on the basis of a measurement of the diameter of the tube downstream of the third gas volume.

In an embodiment, the biaxially oriented tubing to be produced, has a diameter of more than 300 mm OD, e.g. of between 400 and 650 mm OD.

The first aspect of the present invention also relates to an installation for production of a biaxially oriented tube as described herein.

The first aspect of the present invention also relates to biaxially oriented thermoplastic tubing obtained with the method as described herein.

The first aspect of the present invention also relates to biaxially oriented PVC tubing obtained with the method as described herein.

The first aspect of the present invention also relates to biaxially oriented pressure pipe for water transport obtained with the method as described herein.

The first aspect of the present invention also relates an expansion device adapted for use in a method as described herein and/or in an installation as described herein.

The second aspect of the present invention relates to manufacturing biaxially oriented tubing of thermoplastic material.

The second aspect of the invention relates in general to the issue of establishing production processes and production installations that allow to produce biaxially oriented tubing of thermoplastic material, the oriented tubing having a desired uniformity of the final dimensions of the oriented tubing as well as good strength properties, e.g. as the production of rigid pipes, e.g. pressure pipes for transportation of water or gas is envisaged.

When producing biaxially oriented tubing of thermoplastic material, e.g. pipes of polyvinylchloride, it has proven to be difficult to produce tubing with uniform final dimensions. Such uniformity is desirable, e.g. as biaxially oriented tubing elements, e.g. pressure pipes, e.g. for transportation of water, are interconnected end-to-end, e.g. via socket connections.

In WO2011/049436, a production process for producing biaxially oriented tubing of thermoplastic material, e.g. pipes of polyvinylchloride, is disclosed. Herein a tube in preform condition is extruded from thermoplastic material using an extruder which is provided with an extruder die head having an inner die member, the inner die member forming a lumen in the tube in preform condition. The tube in preform condition is subjected to a temperature conditioning, so that a tempered tube in preform condition is obtained having an orientation temperature which is suitable for the thermoplastic material. Use is made of an expansion device which comprises:
- a non-deformable expansion part having an outer surface comprising a conical outer surface portion with a gradually increasing diameter, the expansion part having a maximum diameter at a downstream end thereof,
- a run-on part which is located upstream of the expansion part, the run-on part having an upstream sealing member,
- a run-off part downstream of the expansion part, adjoining the expansion part at a transition.

The expansion device has one or more first gas supply ducts, which one or more first gas supply ducts have an outlet port in the outer surface of the expansion part of the expansion device. In the production process a first gas volume is limited at an upstream end thereof by sealing contact between the tube in preform condition and the upstream sealing member and at a downstream end thereof by sealing engagement between the tube and at least a downstream portion of the expansion part, e.g. near or at the transition to the run-off part. Via these one or more first gas supply ducts, a pressurized gas, e.g. air, is supplied to the first gas volume and the pressure of the gas in this first gas volume causes gradual expansion of the tube already before the tube actually contacts the expansion part. The production process comprises drawing the tempered tube over the expansion device in an axial direction using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube. The biaxially oriented tube is cooled.

In normal practice a dedicated start-up pulling device, e.g. a drum type winch with a pull cable that is attached to the extruded tube, is used to be able to bring the extruded tube over the expansion device.

The second aspect of the invention relates to starting up a production process, e.g. a production process as disclosed in WO2011/049436. In particular in view of the large diameters of tubing to be produced, e.g. more than 300 mm outer diameter (OD), e.g. of between 400 and 650 mm OD, starting up of the production has become a critical issue. The pull force required for starting up may in practice be more than 10 tonnes of pull force.

The second aspect of the invention aims to provide measures that facilitate starting up of such a production process.

The second aspect of the invention provides for a method for starting up a production process of a biaxially oriented tube from thermoplastic material, wherein the conical outer surface portion with the gradually increasing diameter of the non-deformable expansion part of the expansion device is provided with a multiple raised annular lands, the annular lands being spaced axially from one another and each extending circumferentially about the expansion part, the annular lands each being raised relative to one or more recessed surface portions in adjoining annular zones of the conical outer surface portion, which annular zones each extend between successive raised annular lands, and wherein in an initial phase of starting up of the production process the extruded tube emerging from the extruder and pulled ahead by a start-up pulling device arranged downstream of the expansion device, e.g. downstream of the drawing device, is longitudinally slit, preferably by a single longitudinal slit, at a location upstream of the expansion device, at least upstream of the non-deformable expansion part thereof, and wherein the slitting of the extruded tube is terminated at the end of the initial phase, and wherein the initial phase of starting up of the production process is followed by an operative phase of starting up of the production process wherein the operation of the extruder and of the start-up pulling device is continued so that a non-slitted leading portion of the extruded tube advances towards the non-deformable expansion part of the expansion device and engages on the conical outer surface portion of the non-deformable expansion part of the expansion device so that at least one of the raised annular lands sealingly engages the extruded tube, and wherein during the operative phase of starting up of the production process, downstream of the upstream sealing member, a pressurized gas, e.g. air, is supplied between the non-deformable expansion part of the expansion device and the extruded tube, so that the pressurized gas is hindered from escaping by the sealing engagement between the upstream sealing member and the extruded tube one the one hand, and the sealing engagement between the non-slitted leading portion the extruded tube and at least one of the raised annular lands on the other hand, the pressurized gas assisting in reducing the resistance to which the non-slitted leading portion is subjected whilst advancing over the expansion part in the operative phase of the starting up.

In practice, it is observed that the non-slitted portion will first seal onto a first annular land so that a gas pressure is established upstream of the first annular land. As the tube under the pull force exerted by the start-up pulling device keeps advancing over the expansion part, the non-slitted leading portion will then seal onto a second, more downstream, annular land and the gas will pass over the first annular land to reach the second annular land and be hindered from escaping by the second annular land. This process is seen to continue over the multiple annular lands in succession until the non-slitted leading portion of the extruded tube has advanced all over the conical surface of the expansion part. This approach, for example compared to starting up such a process wherein the conical surface of the expansion device is smooth like for example shown in FIGS. 3a, 3b, and 4 of WO2011/049436, is vastly more effective and reliable. The pull force required during start-up is significantly reduced.

In an embodiment, the annular zones may each have a conical outer surface without any further relief thereon.

In an embodiment, at least one, for example each, annular zone between successive annular lands is provided with a multitude of dimples forming the recessed surface portions.

In an embodiment, an annular zone between successive annular lands is provided with a circumferential array of a multitude of dimples, e.g. a single array in one annular zone.

In an embodiment, an annular zone between successive annular lands is provided with a multitude of dimples, wherein each dimple is elongated having a length in axial direction and a smaller width seen in circumferential direction. For example, the length is at least twice the width or at least twice the average width in case of a tapering width (e.g. increasing width in downstream direction) of a dimple.

In an embodiment, an annular zone between successive annular lands is provided with a multitude of dimples, e.g. elongated dimples, wherein ridges are present between adjacent dimples, and wherein at least some of the ridges in the annular zone extend in substantially axial direction over the conical outer surface.

In an embodiment, an annular zone between successive annular lands is provided with a multitude of dimples, e.g. elongated dimples, wherein ridges are present between adjacent dimples, and wherein the ridges do not protrude beyond an imaginary conical envelope defined by the adjacent annular lands, preferably are slightly recessed relative to the envelope.

Once start-up of the production process has been completed, that is the drawing device downstream of the expansion device is being engaged with the tube, the pulling device for start-up being released from the tube, and all equipment set to achieve proper operating conditions, it is observed that the design of the conical outer surface portion with the gradually increasing diameter of the non-deformable expansion part of the expansion device provided with the multiple raised annular lands, each being raised relative to one or more recessed surface portions in adjoining annular zones of the conical outer surface portion, which annular zones each extend between successive raised annular lands, also contributes, or at least has the potential to contribute, to a more stable passing of the tube over the expansion device and/or a reduction in pull force to be exerted by the drawing device.

In an embodiment, it is envisaged that, in addition to the conical outer surface portion with the gradually increasing diameter of the non-deformable expansion part of the expansion device, also the run-off part has an outer surface portion that is provided with multiple raised annular lands, the annular lands being spaced axially from one another and each extending circumferentially about the expansion part, the annular lands each being raised relative to one or more recessed surface portions in adjoining annular zones of the respective outer surface portion, which annular zones each extend between successive raised annular lands. Possibly, the surface portion is a reduced diameter surface portion as disclosed in WO2011/049436. Herein, preferably, these annular lands are provided on a cylindrical, constant diameter, portion of the run-off part of the expansion device. Herein, as preferred, the starting up may involve supply of a pressurized gas at a location that is downstream of the transition between the conical expansion part and the run-off part, e.g. of air, between the run-of part of the expansion device and the extruded tube, so that the pressurized gas is hindered from escaping by the sealing engagement at the transition on the one hand, and by the sealing engagement between the non-slitted leading portion the extruded tube and at least one of the raised annular lands on the other hand, the pressurized gas assisting in reducing the resistance to which the non-slitted leading portion is subjected whilst advancing over the run-off part in the operative phase of the starting up.

In an embodiment, e.g. as elucidated in WO2011/049436, use is made of one or more external heat exchange devices that are adapted and operated to influence the temperature of the tube in preform condition and thereby the sealing engagement between the tube and the sealing member of the run-on part of the expansion device.

In an embodiment, use is made of a first heating device that is adapted and operated for controlled external heating of the tube in preform condition, and of a second heating device that is adapted and operated for controlled external heating of the tube in preform condition, wherein the first and second heating device are independently controlled, and wherein the first heating device is arranged upstream of the sealing member of the run-on part, and wherein the second heating device is arranged downstream of the sealing member.

In an embodiment, e.g. as elucidated in WO2011/049436, one or more gas discharge ducts are formed in the expansion device, the one or more discharge ducts having one or more inlet ports in the exterior surface of the expansion part of the expansion device, an inlet port being open or closed or partly closed dependent on whether or not the inlet port is covered and closed by the tube or to which portion of the inlet port is closed by the tube, the gas discharge duct providing for the relief of gas pressure from the fluid volume when the one or more corresponding inlet ports are at least partly open thereby controlling the expansion of the tube caused by internal gas pressure.

In an embodiment, e.g. as elucidated in WO2011/049436, multiple inlet ports, each associated with a corresponding discharge duct, are provided at differing diameter positions in the exterior surface of the expansion part, the differing diameter positions having different radial distances from a central longitudinal axis of the expansion part, wherein one or more operable valves are associated with the discharge ducts, so that a selected inlet port and associated discharge duct can be made effective to relief gas pressure when the tube does not fully cover and close the inlet port, whereas one or more non-selected inlet ports and associated discharge ducts are made ineffective, thereby providing control over the internal diameter of the tube as it expands by the internal gas pressure in the fluid volume before reaching the non-deformable expansion part.

In an embodiment, e.g. as elucidated in WO2011/049436, the upstream sealing member is an annular sealing member fitted on the run-on part, e.g. a metallic member, wherein the sealing member includes a conical run-on surface for the tube, gradually increasing in diameter in downstream direction.

In an embodiment, e.g. as elucidated in WO2011/049436, a second gas volume is established between the run-off part of the expansion device and the oriented tube, preferably between a reduced diameter section of the run-off part and the oriented tube, wherein a pressurized gas, e.g. air, possibly a heated gas, is supplied to the second gas volume. Preferably, the run-off part has a reduced diameter section having a smaller diameter than the maximum diameter of the expansion part, more preferably the reduced diameter section having the raised annular lands, and possibly dimples, as discussed herein.

In an embodiment, e.g. as elucidated in WO2011/049436, at least one outer diameter ring member is arranged around the reduced diameter section of the run-off part, wherein the outer diameter ring member is arranged such that the oriented tube passes through the ring member while being in contact with the ring member, the outer diameter ring member and the reduced diameter section being dimensioned such that seizing of the oriented tube between the run-off part and the at least one outer diameter ring member is avoided. Preferably, the inside of the oriented tube is radially spaced from the reduced diameter section. Preferably, the expansion device has one or more gas supply ducts having one or more outlet ports in the reduced diameter section, a gas being supplied between the reduced diameter section and the oriented tube to establish a second fluid volume there between.

The second aspect of the invention also relates to an installation.

In an embodiment at least one, possibly each, annular zone between successive annular lands is provided with a multitude of dimples forming the recessed surface portions.

In an embodiment, an annular zone between successive annular lands is provided with a circumferential array of a multitude of dimples, e.g. a single array in one annular zone.

In an embodiment, an annular zone between successive annular lands is provided with a multitude of dimples, wherein each dimple is elongated having a length in axial direction and a smaller width seen in circumferential direction.

In an embodiment, an annular zone between successive annular lands is provided with a multitude of dimples, e.g. elongated dimples, wherein ridges are present between adjacent dimples, and wherein at least some of the ridges in the annular zone extend in substantially axial direction over the conical outer surface.

In an embodiment, an annular zone between successive annular lands is provided with a multitude of dimples, e.g. elongated dimples, wherein ridges are present between adjacent dimples, and wherein the ridges do not protrude beyond an imaginary conical envelope defined by the adjacent annular lands, preferably are slightly recessed relative to the envelope.

In an embodiment, the run-off part has an outer surface portion, preferably a cylindrical outer surface portion, that is provided with multiple raised annular lands, the annular lands being spaced axially from one another and each extending circumferentially about the expansion part, the annular lands each being raised relative to one or more recessed surface portions in adjoining annular zones of the outer surface portion, which annular zones each extend between successive raised annular lands, and wherein the expansion device is provided with a gas supply duct having a port for the supply of a pressurized gas at a location that is downstream of the transition between the conical expansion part and the run-off part, e.g. of air, allowing to supply the gas between the run-of part of the expansion device and the tube.

The second aspect of the invention relates to a production process of a biaxially oriented tube from thermoplastic material, in which production process a tube in preform condition is extruded from thermoplastic material using an extruder which is provided with an extruder die head having an inner die member, the inner die member forming a lumen in the tube in preform condition, wherein the tube in preform condition is subjected to a temperature conditioning, so that a tempered tube in preform condition is obtained having an orientation temperature which is suitable for the thermoplastic material, and wherein use is made of an expansion device, the expansion device comprising:
- a non-deformable expansion part having an outer surface comprising a conical outer surface portion with a gradually increasing diameter, the expansion part having a maximum diameter at a downstream end thereof,
- a run-on part which is located upstream of the expansion part, the run-on part having an upstream sealing member,
- a run-off part downstream of the expansion part, adjoining the expansion part at a transition,
- wherein the expansion device has one or more first gas supply ducts, the one or more first gas supply ducts having an outlet port in the outer surface of the expansion device,
- in which production process a first gas volume is limited at an upstream end thereof by sealing contact between the tube in preform condition and the upstream sealing member and at a downstream end thereof by sealing engagement between the tube and at least a downstream portion of the expansion part, e.g. near or at the transition to the run-off part,
- in which production process, via the one or more first gas supply ducts, a pressurized gas, e.g. air, is supplied to the first gas volume, wherein the pressure of the gas in the first gas volume causes gradual expansion of the tube already before the tube actually contacts the expansion part,
- wherein the production process comprises drawing the tempered tube over the expansion device in an axial direction using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube, wherein the biaxially oriented tube is cooled.

As discussed, examples of such a production process are disclosed in WO2011/049436.

The second aspect of the invention also relates to the actual production process, e.g. a production process as disclosed in WO2011/049436. In particular in view of the large diameters of tubing to be produced, e.g. more than 300 mm outer diameter (OD), e.g. of between 400 and 650 mm OD, stability of the production has become a critical issue.

In practice, e.g. using the installation shown in FIGS. 3a, 3b and 4 of WO2011/049436, it has been observed that the tube has the tendency to acquire a corkscrew type motion when the tube passes over the expansion device. This effect is undesired, e.g. in view of quality.

The second aspect of the invention aims to provide measures that enhance such a production process.

The second aspect of the invention provides for a method, wherein the conical outer surface portion with the gradually increasing diameter of the non-deformable expansion part of the expansion device is provided with a multiple raised annular lands, the annular lands being spaced axially from one another and each extending circumferentially about the expansion part, the annular lands each being raised relative to one or more recessed surface portions in adjoining annular zones of the conical outer surface portion, which annular zones each extend between successive raised annular lands.

It has been observed that the presence of the multiple raised annular lands reduces, or eliminates, the tendency for the corkscrew type motion of the tube during production. In addition, a reduction of the pull force to be exerted by the drawing device is witnessed during testing. In general, the production process is seen to be more stable.

The second aspect of the invention also relates to an installation for producing a biaxially oriented tube from thermoplastic material, which installation comprises:
  an extruder with an extruder die head having an inner die member adapted to extrude a tube in preform condition from thermoplastic material, the inner die member forming a lumen in the tube,
  one or more tempering devices for temperature conditioning the perform, so that a tempered tube in preform condition is obtained having an orientation temperature which is suitable for the thermoplastic material,
  an expansion device downstream of the extruder, the expansion device comprising:
  a non-deformable expansion part having an outer surface comprising a conical outer surface portion with a gradually increasing diameter, the expansion part having a maximum diameter at a downstream end thereof,
  a run-on part which is located upstream of the expansion part, the run-on part having an upstream sealing member,
  a run-off part downstream of the expansion part, adjoining the expansion part at a transition,
  wherein the expansion device has one or more first gas supply ducts, the one or more first gas supply ducts having an outlet port in the outer surface of the expansion part of the expansion device, so that a first gas volume can be formed between the expansion device and the tube,
  a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube,
  a cooling device that is adapted to cool the biaxially oriented tube,
  characterized in that the conical outer surface portion with the gradually increasing diameter of the non-deformable expansion part of the expansion device is provided a multitude of dimples forming recessed surface portions.

It is envisaged that even in absence of the discussed raised annular lands the provision of dimples enhances the mentioned stability of the process.

As preferred, e.g. in view of starting up of the production process, these dimples are arranged in one or more annular zones located between successive raised annular lands.

The second aspect of the invention also relates to an expansion device adapted for use in a method and/or in an installation as disclosed herein.

The methods according to the first and/or second aspect of the invention are for instance suitable to produce individual tube elements that are later provided with a socket in a socketing operation, allowing tubes to be connected end to end by inserting an end into a socketed end of another tube, the socket preferably including a sealing ring.

The methods according to the first and/or second aspect of the invention may also include the further step of making individual biaxially oriented tubing elements by severing a tubing element from the tube that extends from the extruder, over the expansion device, and beyond the drawing device downstream of the expansion device, e.g. tubing elements having a length between 5 and 15 meters, e.g. 6 meters, and the step of providing a socket on an end of each individual tubing element so that individual tubing elements are connectable via a socket connection.

The first and/or second aspect present invention also relates to a biaxially oriented tube obtained with a method according to one or more of the aspects of the invention. In a preferred embodiment, the tube is a biaxially oriented tube of polyvinylchloride. In a preferred embodiment, the tube obtained is a water or gas transport pipes, e.g. for potable water, e.g. of polyvinylchloride.

For example, it is envisaged to produce with a method according to one or more of the aspects of the invention a biaxially oriented pipe, e.g. of PVC, having a pressure rating above 8 Bar, e.g. of 12.5 Bar, at 20° C., e.g. with an outer diameter between 63 and 630 millimeters.

The wall thickness of the biaxially oriented pipe produced with a method according to one or more of the aspects of the invention may lie in practice between, for example, 3 and 15 millimeters.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

FIGS. 1a, 1b and 1c show schematically an example of an installation for producing biaxially oriented thermoplastic tubing according to the present invention.

FIGS. 5a and 5b shows an embodiment of the expansion device according to the second aspect of the invention.

FIG. 6 illustrates the start-up of production process with the inventive expansion device.

DETAILED DESCRIPTION OF THE INVENTION

Figure 1B:
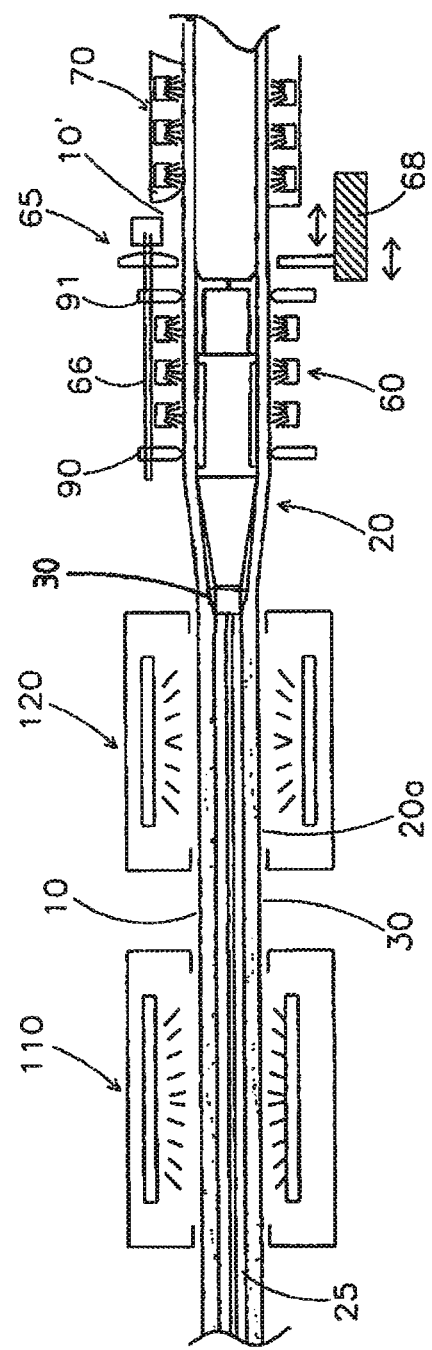
Figure 1C:
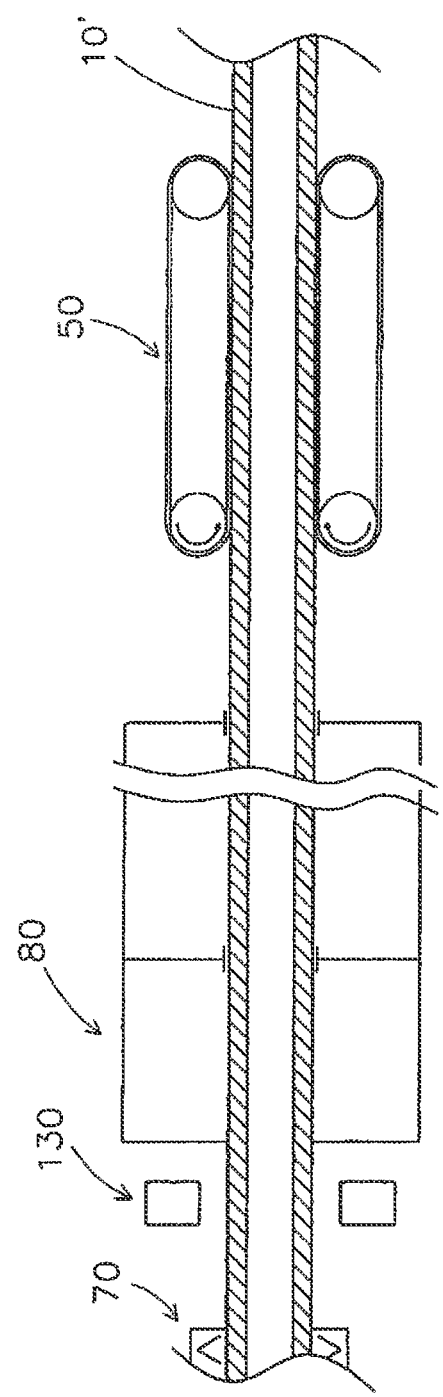

FIGS. 1a, 1b and 1c are not to scale and schematically show consecutive portions of an example of an installation for producing biaxially oriented thermoplastic tubing. These FIGS. are present in view of illustrating both the first aspect and the second aspect of the invention.

The installation is generally horizontal and may in practical embodiments have a length from extruder to final drawing device of over 50 meters.

The installation comprises an extruder 1 having one or more extruder screws 2 by means of which a flow of molten thermoplastic material is provided, e.g. of polyvinylchloride (PVC).

The thermoplastic material is fed to a die head 3 arranged on the extruder 1. The die head 3 has an outer body 4 and an inner die member 5, which together with the outer body 4 defines an annular passage from which an extruded tube in preform condition 10 of thermoplastic material emerges, as is preferred in a substantially horizontal direction. The inner die member 5 forms a lumen or axial inner cavity in the tube in preform condition 10.

As is common in this technology a rather thick-walled tube in preform condition 10 is extruded, the wall thickness later being reduced, and the diameter being increased by the biaxial orientation process.

In an alternative embodiment, the die head 3 is an offset die head 3 with an inlet for the extruded material at a lateral side of the die head and with a central axial passage through the die head 3, essentially through the inner die member 5.

Preferably, the die head 3 is provided with means for controlling and adjusting the annular passage in order to control the wall thickness and/or cross-sectional shape of the tube in preform condition 10 emerging from the die head 3. This type of die head 3 is known in the art. Preferably, an appropriate measuring device 6 is arranged directly downstream of the die head 3 and measures the emerging tube in preform condition 10 to provide control signals for the die head 3.

As is preferred, an external cooling device 8 is arranged downstream of the extruder 1 and the die head 5 to cool and temper the thick walled tube in preform condition 10, e.g. from about 200° C. to about 100° C. for PVC. The external cooling device 8 may e.g. comprise a number of compartments behind one another through which cooling water is circulated, the tube in preform condition 10 being in direct contact with the cooling water in each compartment. The temperature of the cooling water may vary from one compartment to another. If desired, it can be arranged that the cooling water circulation in each compartment may be switched on or off.

An outer diameter calibrating device 8a may be provided at the upstream end of the external cooling device 8.

For temperature conditioning of the tube in preform condition 10, in embodiments, a liquid circulation compartment 25 may be formed in the lumen of the tube in preform condition 10 between a closing member 26 at a distance upstream from the nose end of the run-on part 20a on the one hand and the sealing member 30 on the other hand. A liquid of controlled temperature, e.g. water, is circulated through the liquid circulation compartment in direct contact with the inside of the tube in preform condition 10. This allows to establish an effective internal temperature conditioning of the tube in preform condition directly upstream of the expansion device. In practice the internal temperature condition may be effected with hot water, e.g. close to the orientation temperature, e.g. close to the boiling temperature of water when producing biaxially oriented PVC tubing.

The closing member 26 may be arranged on the anchoring rod 21, but here is arranged on the inner member 5 of the die head 3. By choosing the location of the closing member 26 the effective length of the compartment 25 can be established.

The water to be circulated through the compartment 25 is supplied from a water source, preferably including a pump and a water heater, via one or more ducts in the rod 21. The return flow of water leaving the compartment 25 is discharged via one or more other ducts in the rod 21.

Downstream of the external cooling device 8 a first drawing device 15, which may also be referred to as a preform speed-control device, is arranged. Preferably, the device 15 includes multiple tracks engaging on the exterior of the tube in preform condition 10, the speed of the tracks being controlled by a suitable track drive system. Such drawing devices 15 are customary in plastic pipe extrusion.

In an embodiment not shown here, an external heating device for the tube in preform condition is arranged between the external cooling device 8 and the first drawing device 15, the heating device being adapted to heat in an adjustable manner one sector of the circumference of the tube 10, or possibly multiple selected sectors of the circumference of the tube 10, e.g. only a bottom section of the tube 10 and not the remainder of the circumference of the tube 10, prior to reaching the first drawing device 15. It has been found that heating only a bottom section of the tube 10 at this position is beneficial for the uniformity of the wall thickness of the finally obtained tube. This external heating device could comprise one or more infrared heating elements.

The FIG. 1b schematically depicts an expansion device 20, which will be discussed in more detail below.

The expansion device 20 is held in place by means of an anchoring rod 21 that is at one end fastened to the expansion device 20. The other end of the anchoring rod 21 is connected at the location of the extruder, here to the die head 3. In an offset die head, the rod 21 could also be fastened to an anchoring device arranged at or near the extruder.

Instead of one extruder 1, multiple extruders 1 could be provided to supply molten material to the die head 3.

As is preferred a force sensing assembly 22 is provided to measure the pull force on the anchoring rod 21 during operation of the installation.

At a distance downstream of the expansion device 20, as is common in this technology, a further drawing device 50 is arranged. This drawing device 50 is adapted to exert a considerable tensile force on the oriented tube 10. In general the passage of the suitably tempered tube 10 over the expansion device 20 under the influence of the tensile force exerted by the drawing device 50 causes the tube 10 to be expanded in diameter as well as stretched in a considerable manner in axial direction, the wall thickness being significantly reduced in the process so that an biaxially oriented tube 10 is obtained.

As is preferred, an external cooling of the oriented tube is effected soon after the diametrical expansion of the tube 10 has been brought about, preferably as here whilst the tube 10 passes over the run-off part, most preferably starting close to, yet not on, the expansion part.

For this reason, a first external cooling device 60 is provided. This first cooling device 60 preferably includes one or more nozzles spraying or jetting cooling water onto the exterior surface of the oriented tube, preferably with a significant cooling capacity to arrive at an intense external cooling.

In an embodiment, at least one further or second external cooling device 70 is arranged at a relatively short distance downstream of the expansion device 20. This second external cooling device 70 preferably includes one or more nozzles spraying or jetting cooling water onto the oriented tube 10.

Optionally, yet another or third external cooling device 80, preferably embodied with one or more compartments as described with reference to cooling device 8, is arranged downstream of the device 70 and upstream of the drawing device 50 to cool the oriented tube 10 to a final, e.g. ambient, temperature.

Downstream of the drawing device 50 the oriented tube 10 may e.g. be cut to individual tube elements with e.g. a sawing, cutting or milling device or the tube, when appropriate may be spooled onto a reel. This equipment is known in the art.

It is envisaged, in a preferred embodiment, that no calibration of the outer diameter of the biaxially oriented tube by passing the tube through a sizing opening of a calibration device is effected downstream of the expansion device 20. This is considered to avoid a loss of strength of the finally obtained tube due to the impact of the sizing device on the tube.

As can be seen and as is preferred—use is made of at least one external heat exchange or device 110 that is adapted to influence the temperature of the tube in preform condition 10 arriving at the expansion device. For example, the device 110 includes infrared heaters and/or a heated air chamber through which the tube 10 passes. This heat exchange may be done in view of the desired temperature profile yet also in view of the sealing contact between the tube in preform condition 10 and the upstream sealing member 30. As is preferred at least one such heat exchange device is an external heat exchange device that is arranged between the drawing device 15 and the location of the upstream sealing member 30 to influence the temperature of the tube in preform condition 10 from the exterior thereof.

As is preferred, a second external heating device 120 may be provided near or overlapping with (a part of) the expansion part of the expansion device 20.

In an arrangement with a first external heating device 110 directly upstream of the sealing member location and a second external heating device 120 downstream of the sealing member location, each heating device 110, 120 being controllable independently, the first heating device 110 could be used primarily for controlling the sealing engagement with the sealing member 30, and the second heating device 120 in order to influence the tube 10 directly upstream of and/or during the passage of the tube over the expansion part of the expansion device. The heating devices 110, 120 may each include multiple heating elements distributed around the path of the tube, e.g. multiple infrared heating elements.

A control device, e.g. electronic, preferably is provided to control the operation of each external heating device 110, 120. For the external heating device 110 the control may be based on a feedback signal representative of the actual sealing engagement of the tube in preform condition 10 with the sealing member 30, e.g. obtained via a force monitoring device that is adapted to monitor the axial force on the sealing member 30 (e.g. with a strain gauge) or obtained via a monitoring device that is adapted to monitor a local deformation in the moving tube caused by the sealing member 30, e.g. a local bulging of the tube as indicated in FIG. 2, e.g. by measuring the diameter of the preform upstream, at, and downstream of the sealing member.

Figure 2:
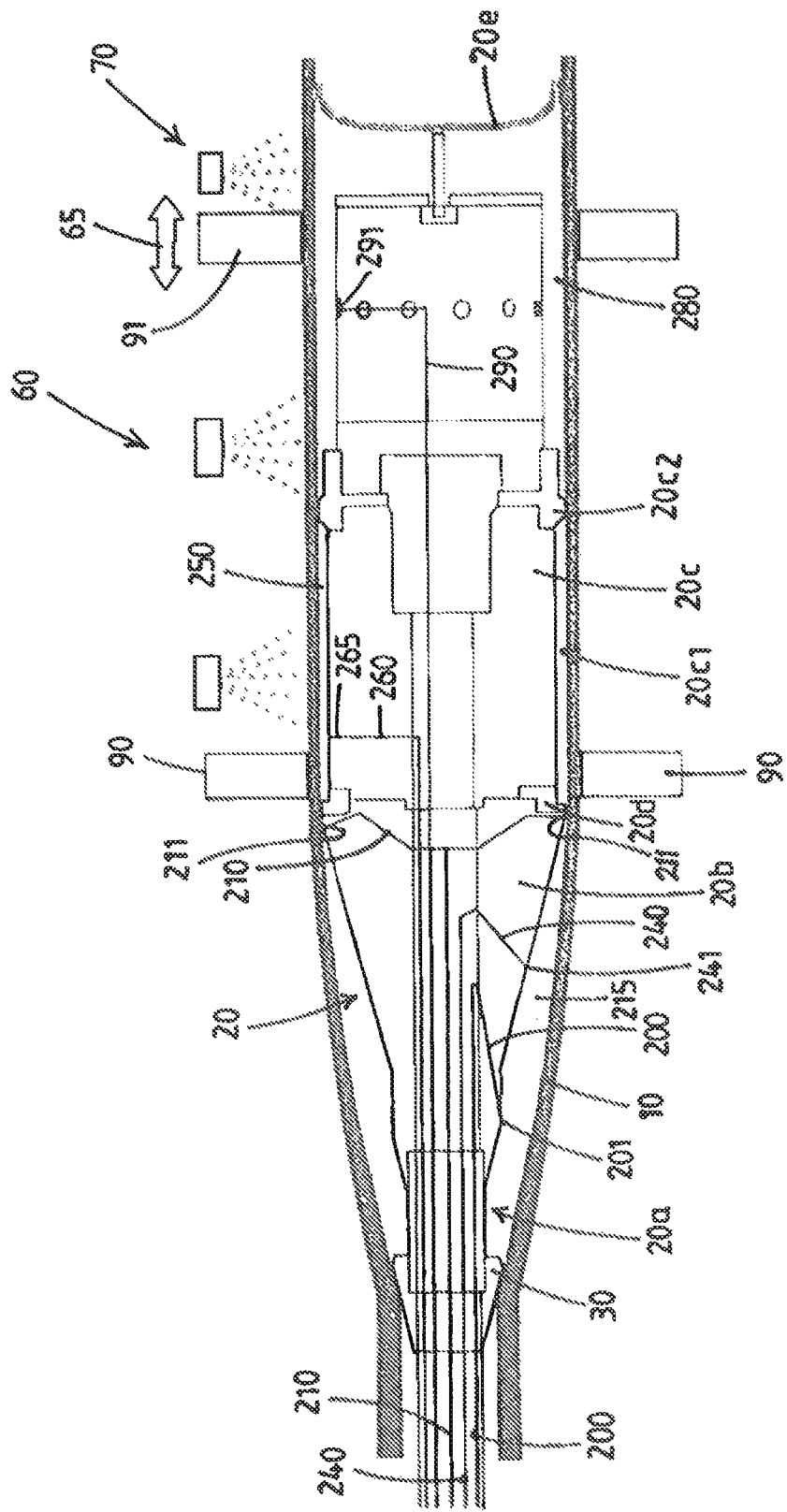
FIG. 2 shows schematically in longitudinal section a part of the installation of FIGS. 1a, 1b and 1c.
Figure 3B:
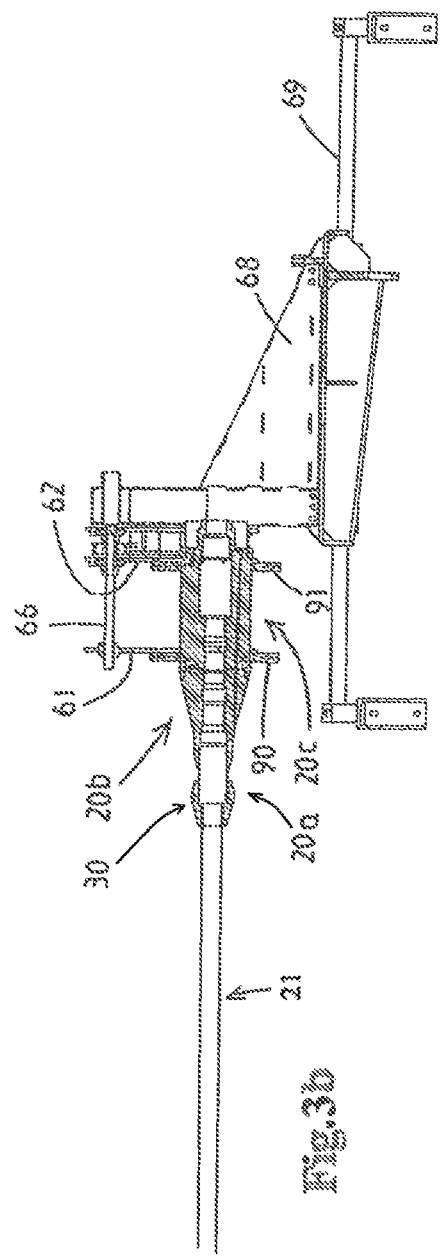
FIGS. 3a and 3b show schematically in perspective view and in longitudinal section components of the part of the installation of FIG. 2.
Figure 3A:
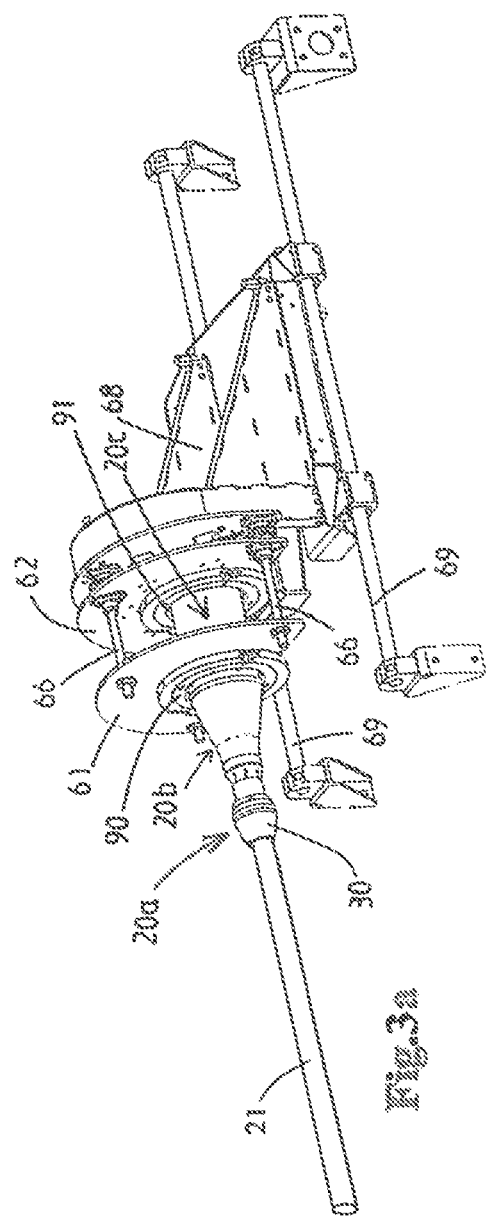
Figure 4:
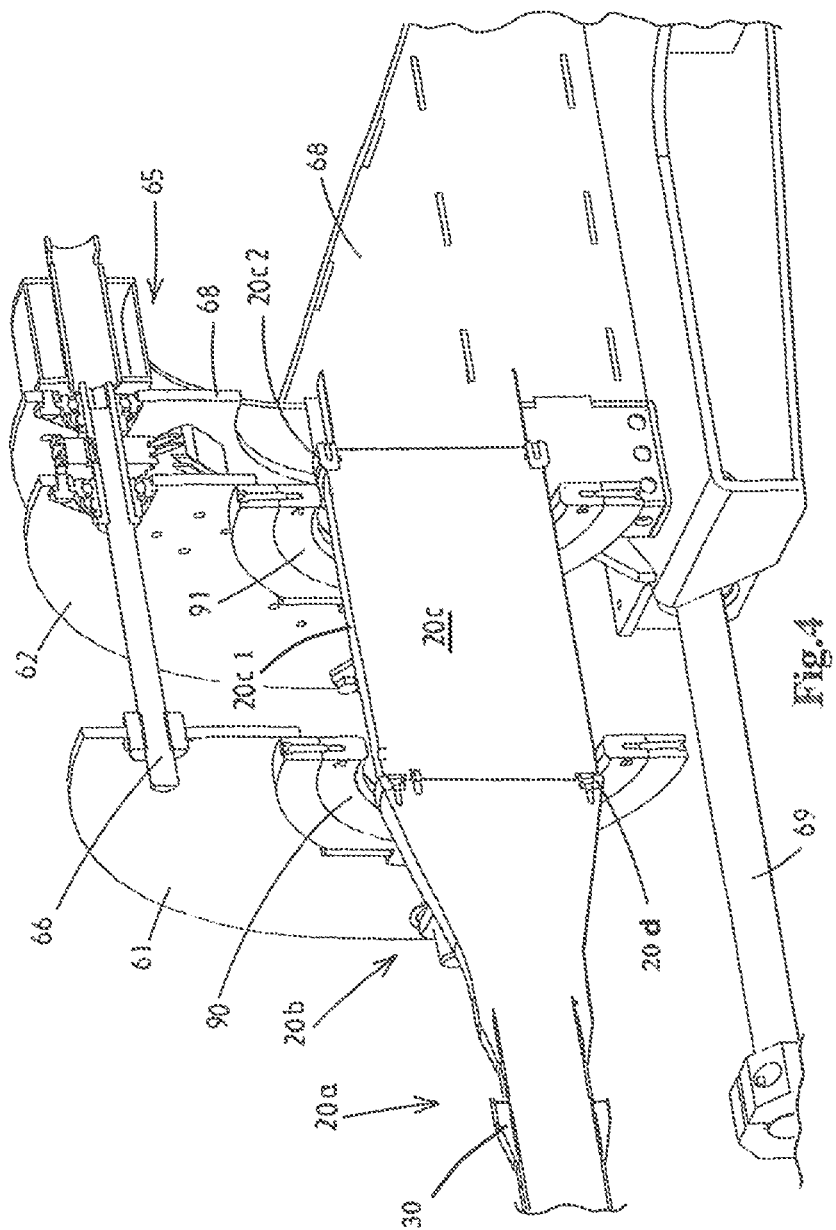
FIG. 4 shows schematically in longitudinal section a portion of the components of FIG. 3.

As can be seen in FIG. 2, the expansion device comprises:
- a non-deformable expansion part 20b having a gradually increasing diameter to a maximum diameter at a downstream end thereof,
- a run-on part 20a which is located upstream of the expansion part 20a, the run-on part having an upstream sealing member 30 arranged upstream of the expansion part 20b,
- a non-deformable run-off part 20c that adjoins the expansion part 20b of the expansion device downstream of the expansion part 20b.

The upstream sealing member 30 is sealingly engaged by the tube in preform condition 10 during production. As is preferred the sealing member 30 is arranged at or in the close vicinity of the nose-end of the run-on part 20a.

The run-off part has a reduced diameter section 20c1 having a smaller diameter than the maximum diameter of the expansion part 20b. The run-off part has a downstream sealing member 20c2 that is downstream of the reduced diameter section 20c1 and has a larger diameter than the reduced diameter section 20c1. As preferred, the reduced diameter section directly adjoins the maximum diameter cross-section of the expansion part, so that a diameter reduction step is present directly behind the maximum diameter position. This can be clearly seen in FIG. 2.

A first gas supply duct 200 is illustrated, which first gas supply duct 200 has one or more first gas outlet ports 201 in the outer surface of the expansion device 20 downstream of the upstream sealing member 30. The one or more gas outlet ports may be provided in the outer surface of the run-on part 20a and/or of the expansion part 20b of the expansion device. Possibly, even preferably, gas is supplied between the tube and the expansion device from one or more ports 201 that are located directly downstream of the sealing member 30.

A first gas discharge duct 210 is illustrated as well. This first discharge duct 210 has one or more first inlet ports 211 in the exterior surface of the expansion part 20b of the expansion device, a first inlet port 211 being open or closed or partly closed dependent on whether or not the first inlet port 211 is covered and closed, or partly closed, by the tube 10.

A first gas volume 215 is present between the expansion device 20 and the tube 10. This first gas volume 215 is limited at an upstream end thereof by sealing contact between the tube in preform condition and the upstream sealing member 30 of the run-on part 20a and a downstream end thereof by sealing engagement between the tube 10 and at least a downstream portion of the expansion part 20b, e.g. near or at the transition to the run-off part, here formed by a replaceable ring 20d at the transition. The sealing member 30 forms an effective and reliable seal that prevents the gas, which is supplied at an elevated pressure that is sufficient for the formation of a gas volume, from reaching the lumen of the tube in preform condition 10 upstream of the sealing member 30.

A first gas flow is effected from a first gas supply source 220, e.g. an air compressor system, e.g. at the end of the duct 200 that emerges from the anchor rod, via the first gas supply duct 200 and the one or more first gas outlet ports 201 thereof into the first gas volume 215 and, dependent on whether or not the first inlet port 211 is covered and closed, or partly closed, by the tube 10, out of the first gas volume 215 via the one or more first gas inlet ports 211 and the first discharge duct 210.

Herein the pressure of the gas, e.g. air, in the first gas volume 215 is used to cause gradual expansion of the tube 10 already before the tube contacts the expansion part 20*b*. This expansion may form the majority of the diametrical expansion of the tube, e.g. about all of the diametrical expansion, e.g. to over 80% of the final diameter of the tube. The remainder of the diametrical expansion is then obtained through the tube being forced over the last section of the expansion part 20*b*, the direct mechanical contact causing the remainder of the diametrical expansion.

The first gas flow that is supplied from the first gas supply source 220 via the first gas supply duct 200 and the one or more first gas outlet ports 201 thereof into the first gas volume 215 is maintained at a gas pressure independent constant first gas flow rate as explained above.

In an embodiment the first gas flow out of the out of the first gas volume 215 via the one or more first gas inlet ports 211 and the first discharge duct 210 is throttled by an adjustable throttle valve 230.

In an embodiment, a control routine is effected by a computerized controller of the installation, or by an operator, wherein the monitored first gas flow out of the first gas volume 215 is compared to the constant first gas flow rate into the first gas volume 215. In an embodiment, the throttle valve 230 of the first gas discharge duct 210 is automatically adjusted on the basis of this comparison.

A first gas pressure sensing duct 240 is illustrated, which is distinct from the first gas supply duct 200 and from the first gas discharge duct 210. The first gas pressure sensing duct 240 has a first gas pressure sensing port 241 in the exterior surface of the expansion part 20*a* of the expansion device. A first gas pressure sensor 242 is in communication with the first gas pressure sensing duct and measures the actual gas pressure in the first gas volume 215. The first sensor 242 is preferably arranged at the extruder side end of the duct 240.

The run-off part 20*c* has reduced diameter section 20*c*1 having a smaller diameter than the maximum diameter of the expansion part. The run-off part has a downstream sealing member 20*c*2 that is downstream of the reduced diameter section 20*c*1.

A second gas volume 250 is established between the reduced diameter section run-off part 20*c*1 of the expansion device and the tube 10. The second gas volume is separated from the first gas volume 215 through an upstream sealing engagement of the tube 10 with the expansion device in a transition region 20*d*. The second gas volume 250 is delimited by a downstream sealing engagement between the tube and the downstream sealing member 20*c*2 of the run-off part.

A second gas duct 260 is illustrated having a port 261 in the exterior surface of the reduced diameter section 20*c*1 of the run-off part. As preferred, the second has duct 260 extends through the anchor rod 21 to an end thereof at or near the extruder 1.

The second gas duct 260 is connected to a second gas source 265, e.g. an air compressor system. The pressure of the gas in the second gas volume 250 is, in an embodiment of the production of biaxially oriented tubing, preferably maintained at a constant second gas pressure.

In an embodiment, a second gas flow monitoring device 263 is provided that is operated to monitor any gas flow into and out of the second gas volume 250 via the second gas duct 260.

It is shown that an upstream outer diameter ring member 90 is arranged around the tube at an axial location corresponding to the axial location of the reduced diameter section 20*c*1, wherein the upstream outer diameter ring member 90 is arranged such that the oriented tube passes through the upstream outer diameter ring member while being in contact with the upstream outer diameter ring member.

A gas compartment sealing member 20*e* is arranged at a distance downstream of the non-deformable run-off part 20*c* of the expansion device so that a third gas volume 280 is established in the lumen of the tube downstream of the run-off part 20*c*.

The third gas volume 280 is separated from the second gas volume 250 through the downstream sealing engagement between the tube and the downstream sealing member 20*c*2 of the run-off part.

A third gas duct 290 has a port 291 in communication with the third gas volume 280. The third gas duct, as preferred, extends through the anchor rod 21 to an end thereof at or near the extruder 1. The third gas duct 290 is connected to a third gas source 295, e.g. an air compressor system. The pressure of the gas in the third gas volume 280 is, in an embodiment of the production of biaxially oriented tubing, preferably maintained at a constant third gas pressure.

A third gas flow monitoring device 293 is provided that is operated to monitor any gas flow into and out of the third gas volume 280 via the third gas duct.

A downstream outer diameter ring member 91 is arranged around the tube at an axial location corresponding to the axial location of the third gas volume 280. The downstream outer diameter ring member is arranged such that the oriented tube passes through the downstream outer diameter ring member while being in contact with the downstream outer diameter ring member.

The first external cooling device 60 is adapted and operated to cool the oriented tube externally while passing over the run-off part in a region between the upstream and the downstream outer diameter ring members 90, 91.

The mentioned ducts all extend through or along the anchoring rod 21 for supply and discharge of gas (e.g. air).

Also the anchoring rod 21 may include one or more ducts for electrical wiring, e.g. to connect to one or more sensors (e.g. pressure and/or temperature) in the lumen of the tube and/or the expansion device, or e.g. to control one or more valves or other electronic components, possibly housed within or at the downstream end of the expansion device.

In general, the expansion device 20 shown here includes—from upstream to downstream end thereof—a run-on part 20*a*, an expansion part 20*b*, and a run-off part 20*c*. The expansion part 20*b*—as is preferred—has at least one non-deformable or rigid portion with a gradually increasing diameter in downstream direction, e.g. of conical shape, e.g. with the outer surface of a truncated cone, so as to come into contact with the tube 10 and to exert an expanding force on the tube 10 that brings about diametrical expansion of the tube 10. The expansion part 20*b* has a maximum diameter at its downstream end, the run-off part 20*c* here has a diameter that does not exceed the maximum diameter, in fact is preferably less over a reduced diameter section as explained.

The expansion part 20b, and as is preferred also the run-on part 20a and the run-off part 20c, here is/are of rigid, non-deformable embodiment.

As is preferred, there is no external part of the installation at the height of the upstream sealing member 30 that presses the tube in preform condition 10 onto the sealing member 30 as this would cause a risk of damaging the tube in preform condition, of disturbing the expansion and also entail a risk of seizing of the tube in preform condition between the upstream sealing member 30 and any external part.

This upstream sealing member 30 and the sealing engagement thereof with the tube in preform condition 10 during the production process is advantageous as it provides a barrier between the zone upstream of the sealing member 30 and the zone downstream of the sealing member 30 within the lumen of the tube in preform condition 10, so that conditions and/or actions can be performed in the zones that are fully or at least largely independent from one another.

As is preferred, the sealing member 30 is a separately manufactured annular member fitted on a tubular member of the run-on part.

As is preferred, the sealing member 30 is a metallic member with no provision to supply a lubricant to the outer surface thereof. In more complex embodiments, however the sealing member may be adapted to control the frictional engagement thereof with the tube in preform condition, e.g. provided with a lubrication device, e.g. allowing a gas, e.g. air, to be fed between the sealing portion and the tube in preform condition. In another embodiment the sealing member may be construed to have a variable diameter and an associated control means, e.g. with an outer metallic skin that is expandable under hydraulic pressure, so as to control the sealing engagement with the tube in preform condition.

Possibly, the reduced diameter section directly adjoins the maximum diameter cross-section, so that a diameter reduction step occurs directly behind the maximum diameter position.

Use is made here of at least one outer diameter ring member, here—as preferred—two ring members 90, 91, through which the tube 10 passes at the location of the run-off part of the expansion device, here at the location of the reduced diameter section of the run-off part 20c.

The presence of two outer diameter ring members 90, 91 spaced apart from one another is advantageous, even more advantageous when the run-off part 20c is embodied with an increased diameter portion 20c1 delimiting the downstream end of the reduced diameter section. Preferably, each ring member 90, 91 being mobile in axial direction relative to the reduced diameter section.

As is preferred the ring members 90, 91 here are each embodied as a constrictive outer diameter ring member, which means that each ring member 90, 91 exerts a radial constrictive force on the tube 10 passing there through, thereby reducing the outer diameter of the tube 10, at least over a short axial distance. In practice this means that the opening within each ring member 90, 91 has a diameter which is less than the projected outer diameter of the oriented tube 10 at the location during the normal production process.

The reduced diameter section here is dimensioned so as to avoid a problem of seizing of the tube between the expansion device 20 and the at least one outer diameter calibrating ring 90, 91.

The reduced diameter section, preferably, has a diameter that is at least 4 millimeters less than the maximum diameter of the expansion part 20b of the expansion device 20. Preferably, the diameter reduction is about twice the wall thickness of the tube passing over the section.

By providing the reduced diameter section the outer diameter ring members 90, 91 can be arranged around the reduced diameter section, with the radial spacing between the ring members 90, 91 and the reduced diameter section being more than the wall thickness of the tube 10 desired during the production process at the location, so that some radial play remains that allows for possible variations in the wall thickness of the tube during the production process, without the risk that the tube becomes stuck between a ring member 90, 91 and the reduced diameter section of the run-off part of the expansion device.

Each ring member 90, 91 may be provided with cooling means for cooling the ring member 90, 91, e.g. with an internal cooling fluid duct, e.g. an annular duct.

Each ring member 90, 91 preferably is composed of two semi-circular parts, allowing to place the ring members 90, 91 around the tube 10, e.g. during the start-up phase of the production process, and allowing to remove, e.g. for exchange, the ring members during the production process.

Each ring member 90, 91 preferably is made of metal.

As indicated above, in order to freeze the orientation of the plastic material, the oriented tube is cooled externally while passing over the run-off part 20c by the first external cooling device 60.

The external cooling by first external cooling device 60 of the tube while passing over the run-off section 20c is here performed in the absence of internal cooling of the tube 10 while passing over the expansion device 20, and in fact also in the absence of any internal cooling downstream of the expansion device 20.

In order to arrive at a biaxially oriented tube 10 with desired dimensions, as wall thickness and cross-sectional shape, preferably without using an outer diameter calibration downstream of the expansion device 20, it has been found possible to rely on the use of the one or more outer diameter ring members 90, 91 and/or the external cooling of the oriented tube.

In a preferred embodiment, the first external cooling device 60 is adapted to adjust the length and/or location with respect to the expansion device 20 of the stretch of the oriented tube 10 that is affected by the first external cooling device 60.

In a very practical embodiment the first external cooling device 60 operates with one or more nozzles emitting sprays or jets of cooling liquid, e.g. water, and comprises an upstream shield member 61 and a downstream shield member 62, the shield members 61, 62 delimiting the stretch of oriented tube that is affected by the sprays or jets of cooling liquid. At least one of the shield members, preferably both, is displaceable in axial direction, thereby allowing to adjust the length and/or the location of the stretch of tube that is affected by the cooling liquid. It will be appreciated that by controlling the length and/or position of the shield members, the cooling of the oriented tube can be controlled, even more when as is common the intensity of the cooling spray can be controlled as well.

In an even more practical embodiment, each of the shield members 60, 61—as depicted here—is integral with a ring member 91, 92.

A displacement device 65, here embodied as motorized drive assembly, for axial displacement of at least one of the ring members 90, 91 in axial direction along the run-off part 20a is provided. In this example, the device 65 includes one or more screw spindles 66, e.g. operated by a common electric motor.

As is preferred, the ring members 90, 91 and shield members 61, 62, as well as the associated displacement device 65, are mounted on a mobile support 68 (here with axial linear guides 69) allowing to displace the components in axial direction, e.g. to a retracted position downstream of the position of the expansion device 20, e.g. in order to allow access to the expansion device e.g. when replacing the expansion device and/or during start-up of the installation.

As is preferred, a second external cooling device 70 is arranged spaced downstream from the first external cooling device 60 and the expansion device 20. The second external cooling device 70, preferably, comprises one or more nozzles emitting sprays or jets of cooling water onto the exterior of the oriented tube 10.

Preferably, the second external cooling device 70 comprises an upstream shield member 71 delimiting the upstream end of the stretch of oriented tubing 10 affected by the external cooling device 70. As is preferred, the upstream shield member 71 is movable in axial direction by an associated displacement device or is coupled to an axially mobile ring member 91 or shield member 62.

Here use is made of a measuring device 130 for measuring at least the outer diameter of the oriented tube 10, and preferably also the wall thickness and/or cross-sectional profile, which measuring device 130 is arranged downstream of the expansion device 20, here downstream of the second external cooling device 70.

Also use is made of a control device (not shown), e.g. an electronic device, which is linked to the measuring device in order to obtain input signals that allow to control the first external cooling device 60 and/or the second external cooling device 70.

For instance, the device 60 is controlled with regard to at least the length and/or location with respect to the expansion device of the stretch of oriented tube that is affected by the first external cooling device 60, and/or the intensity of the cooling.

For instance, the second external cooling device 70 is controlled with regard to the axial position of the upstream shield member 71 and/or the intensity of the cooling.

By control of the external cooling of the tube by the cooling device 60 and/or device 70 the snap-back effect can be controlled, and thus the diameter of the finally obtained tube. This can then be done without the need for any further outer diameter calibration downstream of the expansion device.

In a practical embodiment, this control device is adapted such that the length of the stretch of tube that is affected by the first external cooling device 60 is decreased to obtain an increased snap-back effect and thus increased diameter reduction, and wherein the length is increased to obtain a reduced snap-back effect and thus decreased diameter reduction.

In a practical embodiment, the axial position of the upstream shield member of the second external cooling device 70 is chosen or adjusted to be in the region where the snap-back effect occurs.

With the ring members 90, 91 both suitably dimensioned as constrictive ring members, the effect can be obtained that the ring member 90 may contribute to the sealing engagement of the tube with the expansion device in the region at or near the maximum diameter of the expansion part 20b. This avoids uncontrolled escape or leakage of fluid from the one volume to the other volume.

The ring member 91 may contribute to the sealing engagement of the oriented tube with the increased diameter portion 20c2. This avoids or at least limits any leakage of fluid into the lumen of the oriented tube downstream of the expansion device 20, and thus avoids undesirable instability of the fluid volume. Most preferably, the downstream ring member 91 is located closely upstream of the increased diameter portion 20c2, thereby enhancing the sealing contact between the tube and the increased diameter portion 20c2.

In the embodiment depicted here, the expansion part of the expansion device 20 has a stepped design with a first conical surface increasing in diameter in downstream direction, adjoining a cylindrical surface of a first diameter, followed by a second conical expansion surface increasing in diameter in downstream direction. As is preferred the diameter of the sealing member 30 is greater than the first diameter of the expansion part in this stepped design. The expansion part could have multiple steps.

In an embodiment, one or more rollers are arranged below tube 10 so as to support the tube, e.g. below the run-off part of the expansion device or, with preference, downstream of the expansion device e.g. to avoid interference with any of the rings 90, 91.

In this practical embodiment, an upstream replaceable ring is fitted at the transition 20d between the expansion part 20b and the run-off part 20c of the expansion device, the replaceable ring forming the maximum diameter of the expansion part 20b. This allows for relatively easy change of the maximum diameter of the expansion device as well as replacement of ring in case of wear.

In this practical embodiment, the increased diameter portion 20c2 is formed by a downstream replaceable ring. This allows for relatively easy change of the diameter of the expansion device at the downstream location as well as replacement of the zone in case of wear.

The gas discharge duct 210 provides for the relief of gas pressure from the volume 215 as the corresponding inlet port 211 is fully or at least partly open and thereby the expansion of the tube 10 caused by internal gas pressure is controlled. This relief of gas pressure stops when the inlet port 211 is fully covered and closed by the tube 10.

So, the cooperation of the tube 10 with the inlet port 211 achieves in a very attractive manner a control of the degree of expansion that is caused in the tube 10 due to the internal gas pressure in volume 215. Effectively the position of the inlet port 211 on the sloping exterior face of the expansion part of the device 20 controls where the tube 10 will contact the face, assuming that the gas pressure in volume 215 is sufficient to cause the tube 10 to expand.

It is noted that a group of multiple inlet ports 211 connected to a common gas discharge duct 210 could be arranged distributed around the circumference of the expansion part 20b and at the same radial distance to a central longitudinal axis of the expansion part, so as to avoid that the tube would over-expand somewhere along its circumference.

In another embodiment, multiple inlet ports 211, each associated with a corresponding discharge duct 210, are provided at differing diameter positions in the exterior surface of the expansion part, the differing diameter positions having different radial distances from a central longitudinal axis of the expansion part (so in axial direction of the expansion device one inlet port behind the other inlet port). In this embodiment it is envisaged to provide one or more operable valves that are associated with the discharge ducts, so that a selected inlet port and associated discharge duct can be made effective to relief gas pressure when the tube does not cover and close the inlet port, whereas one or more non-selected inlet ports and associated discharge ducts are made ineffective. This allows to provide control over the internal diameter of the tube as it expands by the internal gas pressure in the fluid volume before reaching the non-deformable expansion part.

FIGS. 5a, 5b and 6 illustrate an example of the innovative expansion device 100 and start-up approach according to the second aspect of the invention.

The expansion device 100 can be integrated in the installation as discussed herein with reference to FIGS. 1a-c, 2, 3a, 3b, and/or 4.

The expansion device 100 comprises a non-deformable expansion part 120b having an outer surface comprising a conical outer surface portion with a gradually increasing diameter. The expansion part 120b has a maximum diameter at a downstream end thereof. Also shown is run-off part 120c downstream of the expansion part 120b, adjoining the expansion part at a transition. At the transition to the run-off part 120c, a replaceable ring 120d can be arranged.

The expansion device 100 has one or more first gas supply ducts 200, the one or more first gas supply ducts having an outlet port 201 in the outer surface of the expansion device, here directly downstream of sealing member 30 of the expansion device.

The expansion device 100 has one or more first gas discharge ducts 210, the one or more discharge ducts having one or more first inlet ports 211 in the exterior surface of the expansion part of the expansion device. For example, an inlet port 211 is open or closed or partly closed dependent on whether or not the inlet port 211 is covered and closed by the tube or to which portion of the inlet port is closed by the tube, the gas discharge duct providing for the relief of gas pressure from the first gas volume when the port is open.

The conical outer surface portion with the gradually increasing diameter of the non-deformable expansion part 120b of the expansion device is provided with a multiple raised annular lands 100a, 100b, 100c, 100d, etc. These annular lands are spaced axially from one another. These lands each extend circumferentially about the expansion part 120b. These annular lands are each raised relative to one or more recessed surface portions in adjoining annular zones 101a, 101b, 101c, 101d, etc., of the conical outer surface portion, which annular zones each extend between successive raised annular lands.

As illustrated, the annular zones may each have a conical outer surface without any further relief thereon. In an alternative embodiment, at least one, for example each, annular zone 101a, 101b, between successive annular lands is provided with a multitude of dimples forming the recessed surface portions. The outline of a possible dimple 121 is shown in FIG. 5a.

In an embodiment, at least one annular zone between successive annular lands is provided with a circumferential array of a multitude of dimples 121, e.g. a single array in one annular zone.

In an embodiment, an annular zone between successive annular lands is provided with a multitude of dimples 121, wherein each dimple 121 is elongated having a length in axial direction and a smaller width seen in circumferential direction.

In an embodiment, an annular zone between successive annular lands is provided with a multitude of dimples 121, e.g. elongated dimples 121, wherein ridges are present between adjacent dimples, and wherein at least some of the ridges in the annular zone extend in substantially axial direction over the conical outer surface.

In an embodiment, an annular zone between successive annular lands is provided with a multitude of dimples 121, e.g. elongated dimples, wherein ridges are present between adjacent dimples. The ridges do not protrude beyond an imaginary conical envelope defined by the adjacent annular lands, preferably are slightly recessed relative to the envelope.

FIGS. 5a, 5b and 6 illustrate the second aspect of the invention.

In an initial phase of starting up of the production process the relatively thick-walled extruded tube 10 emerging from the extruder 1 is pulled ahead by a start-up pulling device, e.g. a winch driving a cable connected to the tube. This start-up pulling device is arranged downstream of the expansion device 100, e.g. downstream of the most downstream drawing device 50. In FIG. 5a this pull action is indicated with arrow F.

The one or more ring members 90, 91 may be absent during the start-up phase, facilitating the first passage of the tube 10 over the run-off part 20c. Later the one or more ring members 90, 91 are fitted or made operative.

The tube 10 emerging from the extruder 1 and after being cooled by external cooling device 8 is provided with a longitudinally extending slit, e.g. using a knife blade, preferably by a single longitudinal slit 180, at a location upstream of the expansion device 100, at least upstream of the non-deformable expansion part 120b thereof. Due to the slit 180 the tube 10 is able to fold open, so widening the slit, and the slotted tube 10 conforms to the exterior of the conical expansion part 120b when being pulled in axial direction, this is schematically depicted in FIG. 5a, and the enlargement thereof in FIG. 5b.

This slitting of the tube is been terminated at the end of the initial phase of the start-up, so that from that moment on the tube arriving at the expansion device 100 has a continuous circumference.

The initial phase of starting up of the production process is followed by an operative phase of starting up of the production process, wherein the operation of the extruder 1 and of the start-up pulling device is continued so that a non-slitted leading portion of the tube 10 advances towards the non-deformable expansion part 120b of the expansion device 100. This portion then engages on the conical outer surface portion of the non-deformable expansion part so that at least one of the raised annular lands 101a, b, sealingly engages the extruded tube.

During this operative phase of starting up of the production process, downstream of the upstream sealing member 30, a pressurized gas, e.g. air, is supplied between the expansion device 100 and the tube, so that the pressurized gas is hindered from escaping by the sealing engagement between the upstream sealing member and the extruded tube one the one hand, and the sealing engagement between the non-slitted leading portion the extruded tube and at least one of the raised annular lands on the other hand. The gas is, preferably, supplied via the first gas supply duct 200 and the associated inlet port 201. This pressurized gas assists in reducing the resistance to which the non-slitted leading portion is subjected whilst advancing over the expansion part 120b in the operative phase of the starting up.

The FIG. 6 shows that the non-slitted leading portion of the tube 10 has advanced further over the expansion part 120b, which process is continued until the tube 10 has been pulled over the entire expansion device 100.

The FIGS. 5a, b and 6 also illustrated that the run-off part 120c has an outer surface portion, preferably a cylindrical outer surface portion, that is provided with multiple raised annular lands 102a, 102b, 102c. These annular lands are spaced axially from one another and each extend circumferentially about the run-of part. These annular lands are each raised relative to one or more recessed surface portions in adjoining annular zones 103a, 103b, 103c, 103d of the outer surface portion. These annular zones each extend between successive raised annular lands.

The expansion device 100 is provide with a second gas duct 260 having a port 261 for the supply of a pressurized gas at a location that is downstream of the transition 120d between the conical expansion part and the run-off part, allowing to supply the gas between the run-of part 120c of the expansion device and the tube 10. During the operative phase of starting up of the production process, once the non-slitted portion of the tube 10 has advanced to or beyond the transition 120d, a pressurized gas, e.g. air, is supplied via duct 260. Once the non-slitted part of the tube 10 has reached the first annular land 101a, the pressurized gas is hindered from escaping by the sealing engagement at then transition 120d on the one hand, and the sealing engagement between the non-slitted leading portion the extruded tube and the raised annular land 102a on the other hand. The pressurized gas then assists in reducing the resistance to which the non-slitted leading portion is subjected whilst advancing over the expansion part in the operative phase of the starting up.

The invention claimed is:

1. A method for producing a biaxially oriented tube from thermoplastic material comprising:

drawing a tempered tube in preform condition over an expansion device using a drawing device to transform the tempered tube from the tempered tube in preform condition into a biaxially oriented tube with thermoplastic material that is oriented in an axial direction and in a circumferential direction of the biaxially oriented tube; and cooling the biaxially oriented tube;

wherein an extruded tube in preform condition is extruded from thermoplastic material using an extruder which is provided with an extruder die head having an inner die member, the inner die member forming a lumen in the extruded tube in preform condition, wherein the extruded tube in preform condition is subjected to a temperature conditioning so that the tempered tube in preform condition is obtained having an orientation temperature which is suitable for the thermoplastic material;

wherein the drawing device is arranged downstream of the expansion device;

wherein the expansion device comprises:

a non-deformable expansion part having a gradually increasing diameter to a maximum diameter at a downstream end thereof;

a run-on part which is located upstream of the expansion part, the run-on part having an upstream sealing member arranged upstream of the expansion part;

a first gas supply duct, the first gas supply duct having one or more first gas outlet ports in an outer surface of the expansion device downstream of the upstream sealing member; and a first gas discharge duct, the first discharge duct having at least one first inlet port in an exterior surface of the expansion part of the expansion device, the first inlet port being open or closed or partly closed dependent on whether or not the first inlet port is covered and closed, or partly closed, by the tempered tube;

wherein a first gas volume is present between the expansion device and the tempered tube, the first gas volume being limited at an upstream end thereof by sealing contact between the tempered tube in preform condition and the upstream sealing member of the run-on part and at a downstream end thereof by sealing engagement between the tempered tube and at least a downstream portion of the expansion part;

wherein a first gas flow is effected from a first gas supply source via the first gas supply duct and the one or more first gas outlet ports thereof into the first gas volume and, dependent on whether or not the first inlet port is covered and closed, or partly closed, by the tempered tube, out of the first gas volume via the one or more first gas inlet ports and the first discharge duct, wherein the pressure of the gas in the first gas volume is used to cause gradual expansion of the tempered tube already before the tempered tube contacts the expansion part of the expansion device; and wherein the first gas flow that is supplied from the first gas supply source via the first gas supply duct and the one or more first gas outlet ports thereof into the first gas volume is maintained at a gas pressure independent constant first gas flow rate.

2. The method according to claim 1, wherein the first gas flow out of the first gas volume via the one or more first gas inlet ports and the first discharge duct is throttled by an adjustable throttle valve.

3. The method according to claim 2, wherein the method further comprises:

a control routine wherein a monitored first gas flow out of the first gas volume is compared to the gas pressure independent constant first gas flow rate into the first gas volume;

wherein the throttle valve of the first gas discharge duct is automatically adjusted on the basis of this comparison.

4. The method according to claim 1, wherein the expansion device further comprises a first gas pressure sensing duct distinct from the first gas supply duct and distinct from the first gas discharge duct;

wherein the first gas pressure sensing duct has a first gas pressure sensing port in an exterior surface of the expansion part of the expansion device; and wherein a first gas pressure sensor is in communication with the first gas pressure sensing duct and measures an actual gas pressure in the first gas volume.

5. The method according to claim 1, wherein the expansion device further comprises a non-deformable run-off part that adjoins the expansion part of the expansion device downstream of the expansion part;

wherein the run-off part has a reduced diameter section having a smaller diameter than the maximum diameter of the expansion part;

wherein the run-off part has a downstream sealing member that is downstream of the reduced diameter section;

wherein a second gas volume is established between the reduced diameter section and the biaxially oriented tube, the second gas volume being separated from the first gas volume through an upstream sealing engagement of the biaxially oriented tube with the expansion device in a transition region thereof, and the second gas volume being delimited by a downstream sealing engagement between the biaxially oriented tube and the downstream sealing member of the run-off part;

wherein the expansion device further comprises a second gas duct having a port in an exterior surface of the reduced diameter section of the run-off part;

wherein the second gas duct is connected to a second gas source;

wherein pressure of the gas in the second gas volume is maintained at a constant second gas pressure; and
wherein a second gas flow monitoring device is provided that is configured to monitor any gas flow into and out of the second gas volume via the second gas duct.

6. The method according to claim 5, wherein an upstream outer diameter ring member is arranged around the biaxially oriented tube at an axial location corresponding to an axial location of the reduced diameter section; and
wherein the upstream outer diameter ring member is arranged such that the biaxially oriented tube passes through the upstream outer diameter ring member while being in contact with the upstream outer diameter ring member.

7. The method according to claim 5, wherein a gas compartment sealing member is arranged at a distance downstream of the non-deformable run-off part of the expansion device so that a third gas volume is established in the lumen of the biaxially oriented tube downstream of the run-off part, which third gas volume is separated from the second gas volume through the downstream sealing engagement between the biaxially oriented tube and the downstream sealing member of the run-off part;
wherein the expansion device further comprises a third gas duct having a port in communication with the third gas volume;
wherein the third gas duct is connected to a third gas source;
wherein pressure of the gas in the third gas volume is maintained at a constant third gas pressure; and
wherein a third gas flow monitoring device is provided that is operated to monitor any gas flow into and out of the third gas volume via the third gas duct.

8. The method according to claim 7 further comprising:
cooling, with a first external cooling device, the biaxially oriented tube externally while passing over a non-deformable run-off part that adjoins the expansion part of the expansion device downstream of the expansion part;
wherein an upstream outer diameter ring member is arranged around the biaxially oriented tube at an axial location corresponding to an axial location of the reduced diameter section;
wherein a downstream outer diameter ring member is arranged around the biaxially oriented tube at an axial location corresponding to the axial location of the third gas volume;
wherein the downstream outer diameter ring member is arranged such that the biaxially oriented tube passes through the downstream outer diameter ring member while being in contact with the downstream outer diameter ring member; and
wherein the first external cooling device is adapted and operated to cool the biaxially oriented tube externally while passing over the run-off part in a region between the upstream and the downstream outer diameter ring members.

9. The method according to claim 1 further comprising:
cooling, with a first external cooling device, the biaxially oriented tube externally while passing over a non-deformable run-off part that adjoins the expansion part of the expansion device downstream of the expansion part.

10. An installation for producing a biaxially oriented tube from thermoplastic material comprising:
an extruder configured to extrude a tube in preform condition from thermoplastic material, which extruder is provided with an extruder die head having an inner die member, the inner die member forming, in operation, a lumen in the tube in preform condition;
a temperature conditioning means configured to subject the tube in preform condition to a temperature conditioning, so that a tempered tube in preform condition is obtained having an orientation temperature which is suitable for the thermoplastic material;
a cooling device; and
an expansion device and a drawing device which is arranged downstream of the expansion device, wherein the expansion device comprises:
a non-deformable expansion part having a gradually increasing diameter to a maximum diameter at a downstream end thereof;
a run-on part which is located upstream of the expansion part, the run-on part having an upstream sealing member arranged upstream of the expansion part;
a first gas supply duct, the first gas supply duct having one or more first gas outlet ports in an outer surface of the expansion device downstream of the upstream sealing member; and
a first gas discharge duct, the first discharge duct having at least one first inlet port in an exterior surface of the expansion part of the expansion device, the first inlet port being open or closed or partly closed dependent on whether or not the first inlet port is covered and closed, or partly closed, by the tempered tube;
wherein, in operation, a first gas volume is present between the expansion device and the tempered tube, the first gas volume being limited at an upstream end thereof by sealing contact between the tempered tube in preform condition and the upstream sealing member of the run-on part and at a downstream end thereof by sealing engagement between the tempered tube and at least a downstream portion of the expansion part;
wherein, in operation, a first gas flow is effected from a first gas supply source via the first gas supply duct and the one or more first gas outlet ports thereof into the first gas volume and, dependent on whether or not the first inlet port is covered and closed, or partly closed, by the tempered tube, out of the first gas volume via the first inlet port and the first discharge duct;
wherein the pressure of the gas in the first gas volume is used to cause gradual expansion of the tempered tube already before the tempered tube contacts the expansion part of the expansion device;
wherein the drawing device, in operation, is used for drawing the tempered tube in preform condition over the expansion device;
wherein the tempered tube is transformed from the tempered tube in preform condition into a biaxially oriented tube with thermoplastic material which is oriented in an axial direction and in a circumferential direction of the biaxially oriented tube;
wherein the cooling device is configured to cool the biaxially oriented tube; and
wherein the installation is configured so that the first gas flow that is supplied from the first gas supply source via the first gas supply duct and the one or more first gas outlet ports thereof into the first gas volume is maintained at a gas pressure independent constant first gas flow rate.

11. The installation according to claim 10 further comprising:
an adjustable throttle valve configured to throttle the first gas flow first gas volume via the first inlet port and the first discharge duct.

12. The installation according to claim 11 further comprising:
a computerized controller that is configured to perform a control routine;
wherein a monitored first gas flow out of the first gas volume is compared to the gas pressure independent constant first gas flow rate into the first gas volume; and
wherein the throttle valve of the first gas discharge duct is automatically adjusted on the basis of this comparison.

13. The installation according to claim 10, wherein the expansion device further comprises a first gas pressure sensing duct distinct from the first gas supply duct and distinct from the first gas discharge duct;
wherein the first gas pressure sensing duct has a first gas pressure sensing port in an exterior surface of the expansion part of the expansion device; and
wherein a first gas pressure sensor is in communication with the first gas pressure sensing duct and is configured to measure an actual gas pressure in the first gas volume.

14. The installation according to claim 10, wherein the expansion device further comprises a non-deformable run-off part that adjoins the expansion part downstream of the expansion part;
wherein the run-off part has a reduced diameter section having a smaller diameter than the maximum diameter of the expansion part;
wherein the run-off part has a downstream sealing member that is downstream of the reduced diameter section allowing to establish, in operation, a second gas volume between the reduced diameter section and the biaxially oriented tube;
wherein the expansion device further comprises a second gas duct having a port in an exterior surface of the reduced diameter section of the run-off part;
wherein the second gas duct is connected to a second gas source; and
wherein a second gas flow monitoring device is provided that is configured to monitor any gas flow into and out of the second gas volume via the second gas duct.

15. The installation according to claim 14 further comprising:
an upstream outer diameter ring member that is configured to be arranged around the biaxially oriented tube;
wherein the upstream outer diameter ring member is positioned at an axial location corresponding to an axial location of the reduced diameter section.

16. The installation according to claim 14 further comprising:
a gas compartment sealing member arranged at a distance downstream of the non-deformable run-off part so that, in operation, a third gas volume is established in the lumen of the biaxially oriented tube downstream of the run-off part;
wherein the expansion device further comprises a third gas duct having a port in communication with the third gas volume;
wherein the third gas duct is connected to a third gas source; and
wherein a third gas flow monitoring device is provided that is configured to monitor any gas flow into and out of the third gas volume via the third gas duct.

* * * * *